(12) United States Patent
Tajima et al.

(10) Patent No.: US 10,770,729 B2
(45) Date of Patent: Sep. 8, 2020

(54) ELECTRODE, POWER STORAGE DEVICE, AND ELECTRONIC EQUIPMENT

(71) Applicant: Semiconductor Energy Laboratory Co., Ltd., Atsugi-shi, Kanagawa-ken (JP)

(72) Inventors: Ryota Tajima, Isehara (JP); Junpei Momo, Sagamihara (JP); Masaki Yamakaji, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 29 days.

(21) Appl. No.: 14/988,159

(22) Filed: Jan. 5, 2016

(65) Prior Publication Data
US 2016/0204437 A1    Jul. 14, 2016

(30) Foreign Application Priority Data
Jan. 9, 2015   (JP) .................. 2015-003149

(51) Int. Cl.
| | | |
|---|---|---|
| H01M 2/02 | (2006.01) | |
| H01M 4/62 | (2006.01) | |
| H01M 10/04 | (2006.01) | |
| H01M 4/13 | (2010.01) | |

(52) U.S. Cl.
CPC ............ *H01M 4/62* (2013.01); *H01M 2/02* (2013.01); *H01M 4/13* (2013.01); *H01M 10/0431* (2013.01)

(58) Field of Classification Search
CPC ............ H01M 4/62; H01M 4/13; H01M 2/02; H01M 10/0431; H01M 10/04
See application file for complete search history.

(56) References Cited

U.S. PATENT DOCUMENTS

| | | | | |
|---|---|---|---|---|
| 5,460,904 A | * | 10/1995 | Gozdz | ............ C08J 9/28 429/162 |
| 6,195,251 B1 | * | 2/2001 | Suhara | ............ H01G 9/155 361/502 |
| 7,794,873 B2 | | 9/2010 | Mino et al. | |
| 9,142,358 B2 | | 9/2015 | Kuriki | |

(Continued)

FOREIGN PATENT DOCUMENTS

| | | | | |
|---|---|---|---|---|
| CN | 202308084 | * | 7/2012 | ............ H01M 10/04 |
| JP | 49-129836 A | | 12/1974 | |

(Continued)

OTHER PUBLICATIONS

Engineering Toolbox (online Mar. 1, 2006 {https://web.archive.org/web/20060715000000*/http://www.engineeringtoolbox.com/friction-coefficients-d_778.html}).*

(Continued)

*Primary Examiner* — Cynthia H Kelly
*Assistant Examiner* — Aaron J Greso
(74) *Attorney, Agent, or Firm* — Robinson Intellectual Property Law Office; Eric J. Robinson

(57) ABSTRACT

A flexible power storage device or a power storage device of which the capacity and cycle characteristics do not easily deteriorate even when the power storage device is curved is provided. An electrode in which an active material layer, a current collector, and a friction layer are stacked in this order is provided. Furthermore, a power storage device that includes the electrode as at least one of a positive electrode and a negative electrode is provided.

18 Claims, 26 Drawing Sheets

(56) References Cited

U.S. PATENT DOCUMENTS

| | | | |
|---|---|---|---|
| 10,263,277 B2 | 4/2019 | Pitts et al. | |
| 2004/0142235 A1 | 7/2004 | Parsian | |
| 2006/0164230 A1* | 7/2006 | DeWind | B60K 35/00 340/461 |
| 2006/0222955 A1* | 10/2006 | Ogawa | H01M 2/1653 429/254 |
| 2011/0008662 A1* | 1/2011 | Miyahisa | H01M 4/0435 429/94 |
| 2011/0117417 A1 | 5/2011 | Pitts | |
| 2012/0048729 A1 | 3/2012 | Mikhaylik et al. | |
| 2012/0100408 A1* | 4/2012 | Kwon | H01M 4/70 429/127 |
| 2012/0121957 A1* | 5/2012 | Kwon | H01M 2/204 429/99 |
| 2012/0148902 A1* | 6/2012 | Kwon | H01M 4/667 429/149 |
| 2013/0130119 A1 | 5/2013 | Majima et al. | |
| 2013/0224562 A1 | 8/2013 | Momo | |
| 2015/0099161 A1 | 4/2015 | Hitotsuyanagi et al. | |
| 2015/0188194 A1 | 7/2015 | Mikhaylik et al. | |
| 2015/0243962 A1 | 8/2015 | Hiroki et al. | |
| 2016/0043363 A1 | 2/2016 | Tajima et al. | |
| 2016/0240325 A1 | 8/2016 | Tajima et al. | |

FOREIGN PATENT DOCUMENTS

| | | | | |
|---|---|---|---|---|
| JP | 49-148428 U | | 12/1974 | |
| JP | 10-261438 A | | 9/1998 | |
| JP | 2003-297427 A | | 10/2003 | |
| JP | 2011-513895 | | 4/2011 | |
| JP | 2012-033470 | | 2/2012 | |
| JP | 2013-089441 | * | 5/2013 | .......... Y02E 60/122 |
| JP | 2013-101960 | | 5/2013 | |
| JP | 2013-211262 | | 10/2013 | |
| JP | 2013-538429 | | 10/2013 | |
| JP | 2016-154138 A | | 8/2016 | |
| WO | WO-2006/118053 | | 11/2006 | |
| WO | WO-2009/108185 | | 9/2009 | |
| WO | WO-2012/027457 | | 3/2012 | |

OTHER PUBLICATIONS

Vaziri et al. Wear vol. 122 No. 3, pp. 313-327.*

Tam (Gavin Tam, The Physics Factbook, {https://hypertextbook.com/facts/2004/GarvinTam.shtml} with way back evidence Jul. 22, 2004).*

Handbook of Polymers Copyright 2016—considered Jan. 2016; ChemTec Publishing p. 6335-638 : {https://books.google.com/books?id=aedxCQAAQBAJ&pg=PA636&lpg=PA636&dq=PVDF-HFP+poly(vinylidene+%EF%AC%82uoride-co-hexa%EF%AC%82uoropropylene)+friction+coefficient&source=bl&ots=h0N1QRRuXJ&sig=ACfU3U2FxOslUebLJ_tiOeyKM96P7BE4fg&hl=en&sa=X&ved=2ahUKEwj8pJ3w2_oAhUMmXIEHdxZDEoQ6AEwCHoECAoQAQ#v=onepage&q=PVDF-HFP%20poly(vinylidene%20%EF%AC%82uoride-co-hexa%EF%AC%82uoropropylene)%20friction%20coefficient&f=false}.*

JP S49-129836 English Machine Translation (Espacenet document printed Apr. 23, 2020).*

Engineering Toolbox (Mar. 1, 2006 Wayback posting evidence) {https://www.engineeringtoolbox.com/friction-coefficients-d_778.html}.*

* cited by examiner

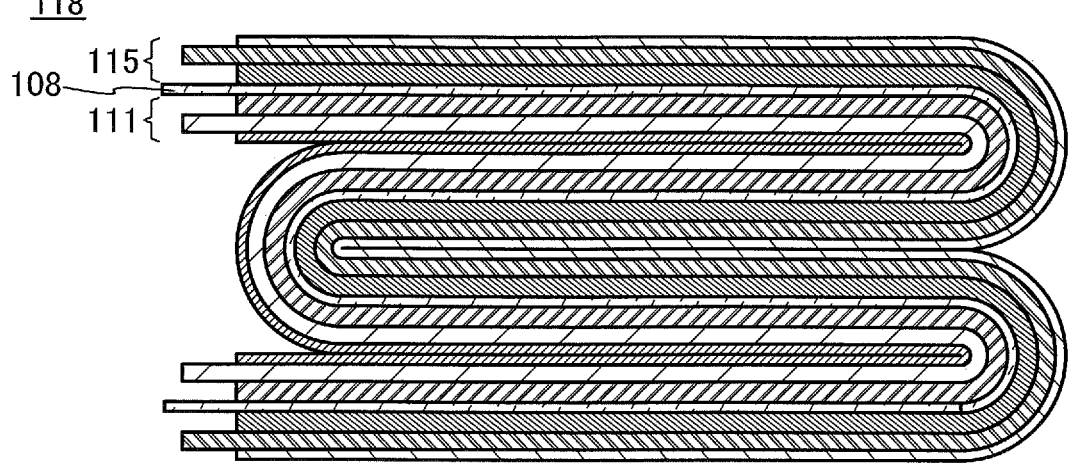

FIG. 15A
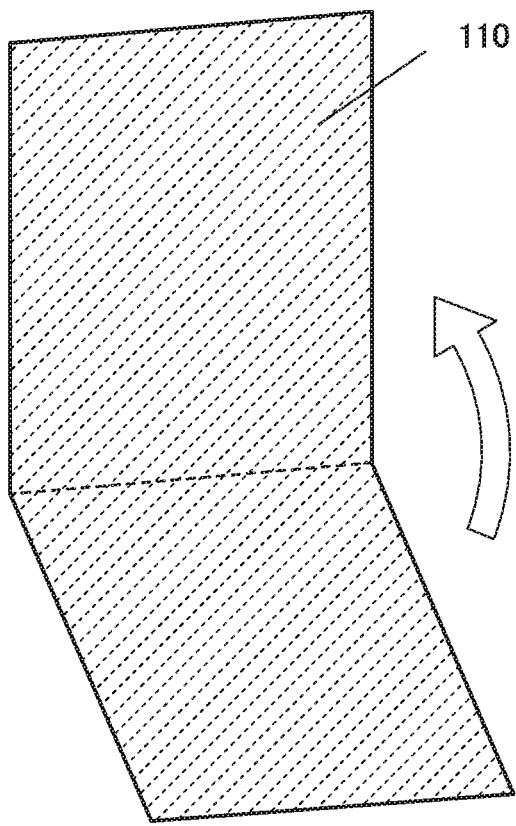
FIG. 15B
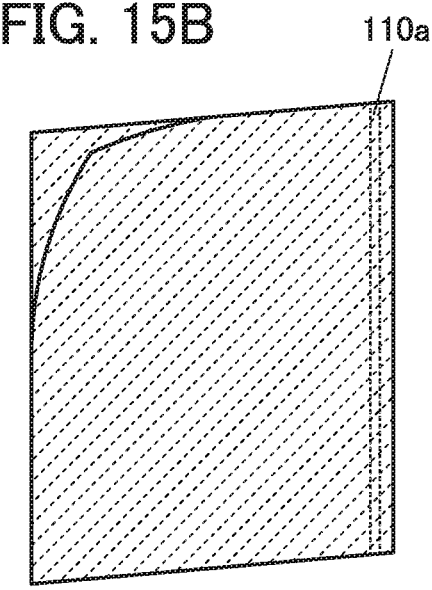
FIG. 15C
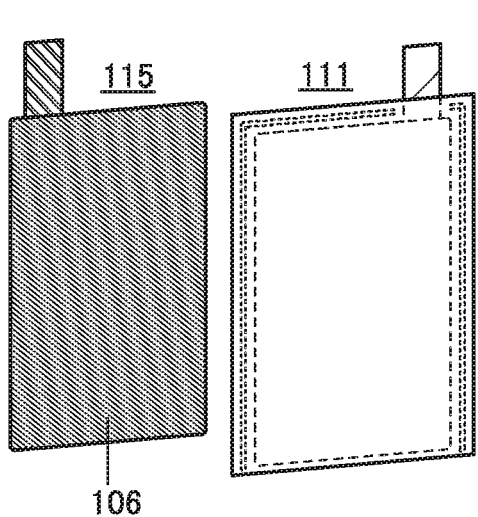
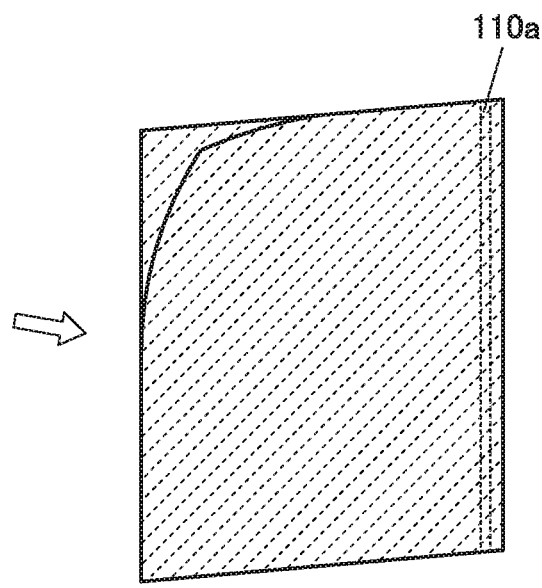

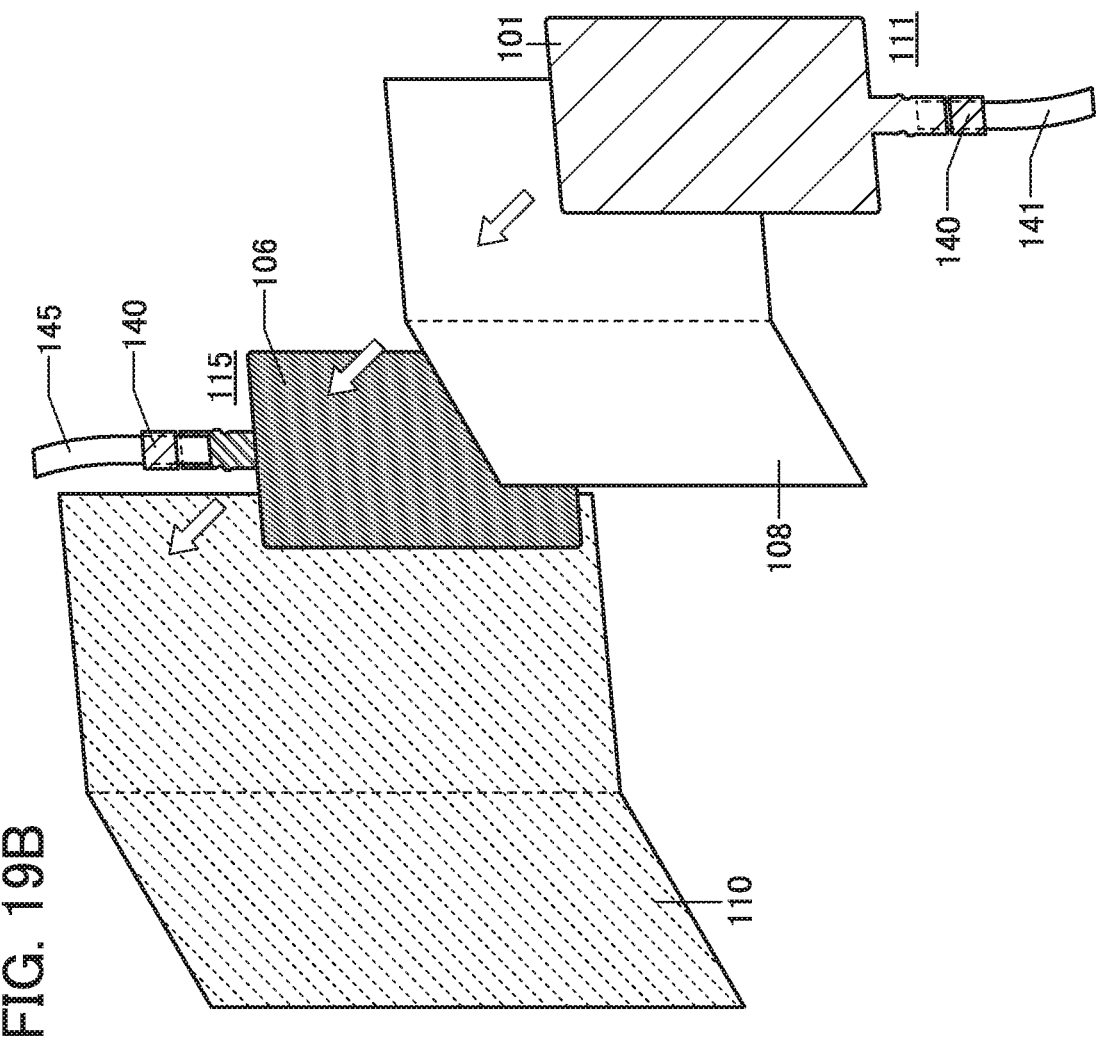
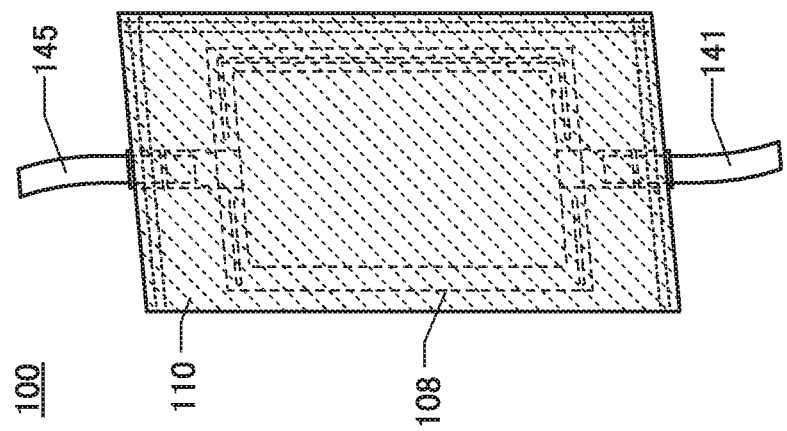
FIG. 19A
FIG. 19B

ELECTRODE, POWER STORAGE DEVICE, AND ELECTRONIC EQUIPMENT

BACKGROUND OF THE INVENTION

1. Field of the Invention

One embodiment of the present invention relates to an electrode, a power storage device, and electronic equipment.

Note that one embodiment of the present invention is not limited to the above technical field. One embodiment of the invention disclosed in this specification and the like relates to an object, a method, or a manufacturing method. One embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

Note that electronic equipment in this specification generally means devices driven by electricity; and electro-optical devices, information terminal devices, and the like are all electronic equipment. Some electronic equipment incorporates a secondary battery. Note that "incorporate" in this specification refers not only to incorporation of a battery in a manner that the battery cannot be detached for replacement, but also to incorporation of a battery in a manner that the battery as a form of battery pack or the like can be freely detached.

2. Description of the Related Art

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for the uses of electronic equipment, for example, portable information terminals such as mobile phones, smartphones, and laptop computers, portable music players, and digital cameras; medical equipment; and next-generation clean energy vehicles such as hybrid electric vehicles (HEVs), electric vehicles (EVs), and plug-in hybrid electric vehicles (PHEVs). The lithium-ion secondary batteries are essential for today's information society as rechargeable energy supply sources.

The development of wearable devices that are used while being worn by the users is also actively carried out. In order to be used more comfortably by the users, wearable devices often have curved shapes or have flexibility. In addition, secondary batteries with curved shapes or flexibility to be incorporated in such wearable devices are being developed.

For example, Patent Document 1 discloses a sheet-like power storage device which can be curved or bent in at least one axis direction, and electronic devices incorporating the power storage device.

REFERENCE

Patent Document

[Patent Document 1] Japanese Published Patent Application No. 2013-211262

SUMMARY OF THE INVENTION

In many secondary batteries, a plurality of positive electrodes and a plurality of negative electrodes are stacked in order to increase the capacity. When such secondary batteries are curved or bent, the capacity and cycle characteristics of the secondary batteries tend to deteriorate.

An object of one embodiment of the present invention is to provide a power storage device having flexibility. Another object of one embodiment of the present invention is to provide a power storage device of which the capacity and cycle characteristics are not likely to deteriorate even when the power storage device is curved or bent. Another object of on embodiment of the present invention is to provide electronic equipment with a flexible power storage device.

Another object of one embodiment of the present invention is to provide a novel electrode, a novel secondary battery, a novel power storage device, or the like. Note that the descriptions of these objects do not preclude the existence of other objects. In one embodiment of the present invention, there is no need to achieve all the objects. Other objects will be apparent from and can be derived from the description of the specification, the drawings, the claims, and the like.

One embodiment of the present invention is an electrode including a current collector, an active material layer, and a friction layer. The active material layer is on one side of the current collector, and the friction layer is on the other side of the current collector.

In the above electrode, friction force acting on the surface of the friction layer is preferably smaller than friction force acting on the surface of the current collector. In the above electrode, the friction layer may include an inorganic film. In the above electrode, the friction layer may include an organic film. The organic film may include fluororesin.

One embodiment of the present invention is a power storage device including a first electrode, a second electrode, and an electrolytic solution. The first electrode is any of the above electrodes and capable of operating as one of a positive electrode and a negative electrode. The second electrode is capable of operating as the other of the positive electrode and the negative electrode.

In the above power storage device, the first electrode may include a first portion and a second portion, each of the first portion and the second portion may include the current collector, the active material layer, and the friction layer, the first portion and the second portion may overlap with each other, and the friction layer in the first portion and the friction layer in the second portion may be in contact with each other.

In the above power storage device, the coefficient of static friction between the friction layer in the first portion and the friction layer in the second portion may be smaller than the coefficient of static friction between the current collector in the first portion and the current collector in the second portion.

In the above power storage device, the first electrode may include a first portion and a second portion, the first portion may include the current collector and the active material layer, the second portion may include the current collector, the active material layer, and the friction layer, the first portion and the second portion may overlap with each other, and the current collector in the first portion and the friction layer in the second portion may be in contact with each other.

In the above power storage device, the coefficient of static friction between the current collector in the first portion and the friction layer in the second portion may be smaller than the coefficient of static friction between the current collector in the first portion and the current collector in the second portion.

In any of the above power storage devices, the second electrode may be the above electrode.

In the above power storage device, the second electrode may include a third portion and a fourth portion, each of the third portion and the fourth portion may include the current collector, the active material layer, and the friction layer, the third portion and the fourth portion may overlap with each other, and the friction layer in the third portion and the friction layer in the fourth portion may be in contact with each other.

In the above power storage device, the coefficient of static friction between the friction layer in the third portion and the friction layer in the fourth portion may be smaller than the coefficient of static friction between the current collector in the third portion and the current collector in the fourth portion.

In the above power storage device, the second electrode may include a third portion and a fourth portion, the third portion may include the current collector and the active material layer, the fourth portion may include the current collector, the active material layer, and the friction layer, the third portion and the fourth portion may overlap with each other, and the current collector in the third portion and the friction layer in the fourth portion may be in contact with each other.

In the above power storage device, the coefficient of static friction between the current collector in the third portion and the friction layer in the fourth portion may be smaller than the coefficient of static friction between the current collector in the third portion and the current collector in the fourth portion.

Any of the above power storage devices may further include a separator between the first electrode and the second electrode. In any of the above power storage devices, the friction layer in the first electrode and the separator may be in contact with each other, and the coefficient of static friction between the friction layer in the first electrode and the separator may be smaller than the coefficient of static friction between the current collector in the first electrode and the separator.

Any of the above power storage devices may have a wound structure. Any of the above power storage devices may have an accordion fold structure. Any of the above power storage devices may further include a flexible exterior body, and the flexible exterior body may enclose the first electrode, the second electrode, and the electrolytic solution.

One embodiment of the present invention is a power storage device including a first electrode, a second electrode, a third electrode, a fourth electrode, and an electrolytic solution. Each of the first electrode and the second electrode is the above electrode. Each of the third electrode and the fourth electrode includes an active material layer and a current collector overlapping with each other. The first electrode and the second electrode are capable of operating as one of a positive electrode and a negative electrode. The third electrode and the fourth electrode are capable of operating as the other of the positive electrode and the negative electrode. The friction layer in the first electrode is in contact with the friction layer in the second electrode. A side of the first electrode with the active material layer faces a side of the third electrode with the active material layer. A side of the second electrode with the active material layer faces a side of the fourth electrode with the active material layer.

In the above power storage device, the coefficient of static friction between the friction layer in the first electrode and the friction layer in the second electrode may be smaller than the coefficient of static friction between the current collector in the first electrode and the current collector in the second electrode.

Any of the above power storage devices may further include a flexible exterior body, and the flexible exterior body may enclose the first electrode, the second electrode, the third electrode, the fourth electrode, and the electrolytic solution.

In any of the above power storage devices, the flexible exterior body may include a film.

Any of the above power storage devices may have flexibility.

One embodiment of the present invention is electronic equipment including any of the above power storage devices and a housing having a curved portion or a display area having a curved portion. One embodiment of the present invention is electronic equipment including any of the above power storage devices and a flexible housing or a flexible display area.

According to one embodiment of the present invention, the electrodes in the power storage device can be protected. According to one embodiment of the present invention, damage to the electrodes can be prevented. According to one embodiment of the present invention, friction force acting on the contact surface when the surface of the electrode and another component come in contact with each other can be decreased. According to one embodiment of the present invention, friction force acting on the contact surface when two electrodes, the electrode and the separator, or the electrode and the exterior body come in contact with each other along with curving of a flexible power storage device is decreased, whereby stress caused by the difference between the inner diameter and outer diameter of the curve can easily be relieved. Thus, damage to the electrode, which is caused by a locally steep curve of the electrode when curving a power storage device, can be prevented. Furthermore, the electrode can be prevented from having a portion with a locally steep curve and a portion being hardly curved, when curving a power storage device. Moreover, variations in distance between the positive electrode and the negative electrode can be reduced. Furthermore, decrease in capacity or deterioration of a power storage device due to curving can be suppressed.

According to one embodiment of the present invention, a flexible power storage device can be provided. According to one embodiment of the present invention, electronic equipment with a flexible power storage device can be provided.

According to one embodiment of the present invention, a novel electrode, a novel electronic device, novel electronic equipment, a novel secondary battery, or a novel power storage device can be provided. Note that the description of these effects does not preclude the existence of other effects. One embodiment of the present invention need not necessarily achieve all the effects listed above. Other effects will be apparent from and can be derived from the description of the specification, the drawings, the claims, and the like.

BRIEF DESCRIPTION OF THE DRAWINGS

In the accompanying drawings:

FIG. 10 illustrates a stack in a secondary battery of one embodiment of the present invention;

FIGS. 15A to 15C illustrate a method for manufacturing a secondary battery of one embodiment of the present invention;

FIGS. 19A and 19B illustrate a method for manufacturing a secondary battery of one embodiment of the present invention;

DETAILED DESCRIPTION OF THE INVENTION

Figure 1:
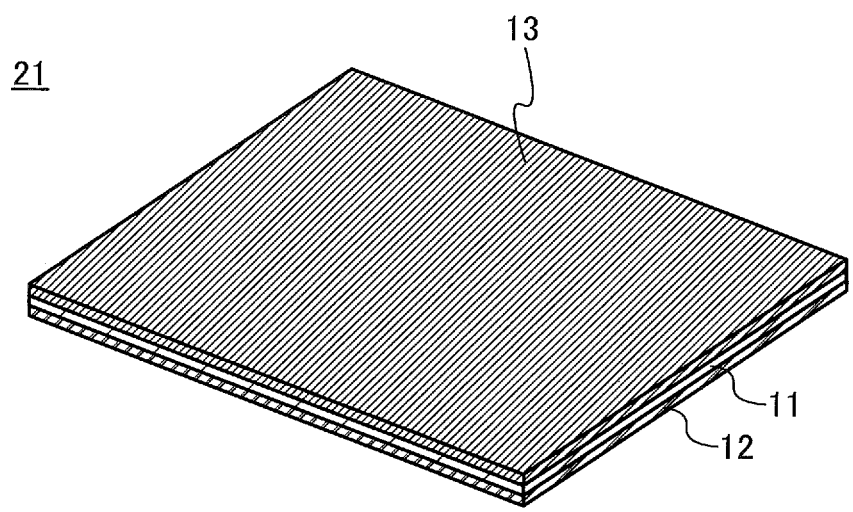
FIG. 1 illustrates an electrode of one embodiment of the present invention.

Embodiments of the present invention will be described below in detail with reference to the drawings. However, the present invention is not limited to the description below, and it is easily understood by those skilled in the art that modes and details disclosed herein can be modified in various ways. Furthermore, the present invention is not construed as being limited to description of the embodiments.

The term "electrically connected" includes the case where components are connected through an "object having any electric function". There is no particular limitation on the "object having any electric function" as long as electric signals can be transmitted and received between the components connected through the object.

Note that the terms "film" and "layer" can be interchanged with each other depending on the case or circumstances. For example, the term "conductive layer" can be changed into the term "conductive film" in some cases, and the term "insulating film" can be changed into the term "insulating layer" in some cases.

The position, size, range, or the like of each component illustrated in drawings and the like is not accurately represented in some cases for easy understanding. Therefore, the disclosed invention is not necessarily limited to the position, size, range, or the like disclosed in the drawings and the like.

In this specification and the like, ordinal numbers such as "first", "second", and "third" are used in order to avoid confusion among components, and the terms do not mean limitation of the number of components.

Embodiment 1

In this embodiment, the structure of an electrode of one embodiment of the present invention will be described with reference to FIG. 1.

An electrode 21 shown in FIG. 1 includes a sheet-like current collector 11, an active material layer 12 on one side of the current collector 11, and a friction layer 13 in contact with the other side of the current collector 11.

It is preferable that friction force acting on the contact surface between the surface of the friction layer 13 and a surface in contact with the friction layer 13 be smaller than friction force acting on the contact surface between the surface of the current collector 11 and a surface in contact with the current collector 11. Specifically, the coefficient of static friction between the friction layer 13 and the surface in contact with the friction layer 13 is preferably less than or equal to 0.6, more preferably less than or equal to 0.2, and even more preferably less than or equal to 0.05.

The current collector 11 is covered with the friction layer 13, whereby the current collector 11 can be protected and prevented from having a crack or the like.

It is preferable to reduce the surface roughness of the friction layer 13, in which case friction force acting on the contact surface between the surface of the friction layer 13 and the surface in contact with the friction layer 13 can be reduced. Specifically, the arithmetic average roughness Ra of at least part of the surface of the friction layer 13 is preferably less than or equal to 1 μm, and more preferably less than or equal to 0.5 μm. The arithmetic average roughness Ra of the friction layer 13 can be determined by measurement using a stylus surface profiler, an atomic force microscope (AFM), or the like.

It is preferable that the friction layer 13 be hard to rupture. For example, it is preferable to use as the friction layer 13 a material achieving a coefficient of expansion right before rupturing of greater than or equal to 5%, more preferably greater than or equal to 10%, when subjected to a test in which tensile stress is applied to the material until its rupture.

Depending on circumstances, a cleavable material may be used as the friction layer 13 such that the surface of the current collector 11 is lubricated.

The current collector 11 is covered with the friction layer 13, whereby friction force acting on the contact surface between the electrode 21 and a peripheral member when a flexible secondary battery is curved can be reduced. Here, a peripheral member refers to a member that potentially comes in contact with the electrode 21 in a flexible secondary battery, such as an exterior body, a separator, or another electrode.

The current collector 11 is covered with the friction layer 13, whereby when the electrode 21 is bent and part of the surface of the electrode 21 comes in contact with another part, friction force acting on the contact surface can be reduced.

Note that in this specification, friction force acting on the contact surface between the surface of the friction layer and another member is referred to as friction force acting on the surface of the friction layer. Furthermore, in this specification, friction force acting on the contact surface between members being small may refer to the coefficient of static friction between the members being small.

A coefficient of static friction in this specification and the like can be determined by measurement by means of an inclined plane method, measurement using a linear slide type tester, or the like.

A coefficient of static friction in this specification and the like can be obtained as follows. As an example, a method for measuring the coefficient of static friction between a sample A and a sample B is described. First, the sample A and the sample B are placed on a horizontal glass plate. A flat plate and a weight are put on the samples. The sample A is fixed to the glass substrate and the sample B is connected to a load-testing machine. The load-testing machine is pulled horizontally at approximately 1 mm/s, for example. The maximum value of the load is measured in a period until the sample B moves 1 cm. The measured value is considered the maximum friction force. When the maximum friction force is F and the normal force exerted by the load comprised of the flat plate, the weight, and the sample B on the opposite material is N, the coefficient of static friction $\mu$ can be obtained from the following equation: $\mu=N/F$.

When a liquid exists at the contact surface between the sample A and the sample B, the coefficient of static friction between the sample A and the sample B may be reduced. In the case where the coefficient of static friction of the contact surface where an electrolytic solution may exist at the time of practical use as a secondary battery is measured, the measurement can be performed after the electrolytic solution is supplied between the sample A and the sample B. When a gel-like electrolytic solution is used in a secondary battery, for example, the electrolytic solution may be hard to be supplied to the contact surface. In the case where the coefficient of static friction of the contact surface of the electrode in such a secondary battery is measured, the electrolytic solution need not be supplied between the sample A and the sample B.

Reduction in the friction force acting on the contact surface between the electrode 21 and the exterior body, the contact surface between the electrode 21 and another electrode, the contact surface between the electrode 21 and the separator, or the contact surface between part of the electrode 21 and another part of the electrode 21 makes it easier to relieve stress caused by the difference between the inner diameter and outer diameter of a curve when a secondary battery is curved. This prevents peeling of the active material layer 12 from the current collector 11, rupture of the current collector 11, or the like which may be caused by a locally steep curve of the electrode 21 when the secondary battery is curved. Accordingly, deterioration of the capacity and cycle characteristics of the secondary battery incorporating the electrode 21 can be suppressed.

The friction layer 13 may be a conductive film or an insulating film. An organic film, an inorganic film, a metal film, or the like can be used as the friction layer 13.

Examples of an organic film include a resin film and a film formed of a low-molecular compound.

A resin film can be formed using one or more of thermal curable resin materials such as an epoxy resin, an acrylic resin, a silicone resin, a phenol resin, and a polyester resin, or one or more of thermoplastic resin materials such as polypropylene, polyethylene, polycarbonate, polystyrene, polyamide, polyetherketone, fluororesin, and polyethylenenaphthalate. Polyoxymethylene may also be used.

Fluororesin is particularly preferable since the coefficient of static friction between fluororesin and another member is small. Note that another member mentioned here includes a member containing the same material. Polytetrafluoroethylene, for example, can be favorably used since the coefficient of static friction between members each containing polytetrafluoroethylene is approximately 0.04.

It is preferable that the friction layer 13 be free from decomposition due to a battery reaction potential. In the case where the battery reaction potential of a negative electrode is low, for example, the use of fluororesin for the friction layer 13 may lead to reductive decomposition of the friction layer 13. For this reason, it is preferable to use fluororesin for the friction layer 13 in the case where the electrode 21 is used as a positive electrode.

Polyetherketone, of which the typical example is polyetheretherketone (PEEK), is preferable because it is excellent in heat resistance, fatigue resistance, and chemical resistance and can reduce friction force acting on the surface of the friction layer 13. Alternatively, a parylene resin of which the typical example is polyparaxylylene may be formed by chemical vapor deposition (CVD) method. Polyparaxylylene is preferable because it is excellent in heat resistance and chemical resistance and can reduce friction force acting on the surface of the friction layer 13.

As a film formed of a low-molecular compound, a self-assembled monolayer (SAM) may be used. Formation of a SAM as the friction layer 13 on the surface of the current collector 11 can reduce friction force acting on the surface of the electrode 21, which is preferable. Alternatively, a liquid repellent SAM may be used. As a liquid repellent SAM, a silane coupling agent having a fluoroalkyl group (i.e., fluoroalkyl silane, hereinafter referred to as FAS) may be used. The current collector 11 which is heated and FAS are confined so as to form a FAS SAM on the surface of the current collector 11 by gas-phase reaction. Alternatively, the friction layer 13 may be formed on the current collector 11 by depositing a solid lubricant such as melamine cyanurate.

As an inorganic film and a metal film, materials that can be attached to the current collector 11 can be used. The use of materials that do not allow lithium ions to be inserted or extracted and are not alloyed or dealloyed with lithium is particularly preferable. For example, the use of a metal sulfide such as molybdenum disulfide ($MoS_2$) or tungsten disulfide ($WS_2$) or a compound having cleavability such as boron nitride (BN), each of which is a typical example of a solid lubricant, as the inorganic film can reduce friction force acting on the surface of the electrode 21. The inorganic film may have an insulating property, and can be an oxide insulating film such as a silicon oxide film, a silicon oxynitride film, a gallium oxide film, a gallium oxynitride film, an yttrium oxide film, an yttrium oxynitride film, a hafnium oxide film, or a hafnium oxynitride film, or a nitride insulating film such as a silicon nitride film or an aluminum nitride film.

For the metal film, for example, a metal material such as aluminum, gold, platinum, silver, nickel, tungsten, chromium, molybdenum, iron, cobalt, copper, or palladium, or an alloy containing any of these metal materials can be used. Lanthanum, neodymium, germanium, or the like may be added to the metal material or the alloy. Furthermore, an alloy containing aluminum (an aluminum alloy) such as an alloy of aluminum and titanium, an alloy of aluminum and nickel, an alloy of aluminum and neodymium, or an alloy of aluminum, nickel, and lanthanum (Al—Ni—La), or an alloy containing silver such as an alloy of silver and copper, an alloy of silver, palladium, and copper (Ag—Pd—Cu, also referred to as APC), or an alloy of silver and magnesium can be used for the metal film. An alloy of silver and copper is preferable because of its high heat resistance.

The friction layer 13 may be a multilayer film that includes two or more of the above-listed organic films, inorganic films, and metal films.

The thickness of the friction layer 13 is preferably greater than or equal to 1% and less than or equal to 80% of the thickness of the current collector 11, in which case excessive increase in thickness of the electrode 21 can be prevented and the battery can be easily curved.

The friction layer 13 may be formed through polishing the current collector 11. For the polishing treatment, the surface of the current collector 11 is smoothed by a plastic smoothing action or frictional polishing action using an abrasive agent such as abrasive-coated cloth and paper or abrasive grains. As the polishing treatment, chemical mechanical polishing (CMP) may also be used.

Note that the friction layer 13 need not cover the entire surface of the other side of the current collector 11. In the case where a plurality of electrodes 21 are electrically connected to each other by welding end portions thereof, for example, it is preferable that the friction layer 13 be not provided on the end portions of the electrodes 21. Furthermore, the friction layer 13 need not be provided in the area of the electrode 21 which is not in contact with a peripheral member. Minimizing the size of the friction layer 13 reduces the material required for forming the friction layer 13, whereby the manufacturing cost of the electrode 21 can be cut down.

Next, materials that can be used for current collector 11 and the active material layer 12 in the electrode 21 will be described.

The current collector 11 can be formed using a highly conductive material which is not alloyed with a carrier ion such as a lithium ion, for example, a metal such as stainless steel, gold, platinum, iron, copper, aluminum, or titanium, or an alloy thereof. Alternatively, an aluminum alloy to which an element that improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, and nickel. The current collector 11 can have a foil-like shape, a plate-like shape (sheet-like shape), a net-like shape, a punching-metal shape, an expanded-metal shape, or the like as appropriate. The current collector 11 preferably has a thickness greater than or equal to 5 μm and less than or equal to 30 μm. The surface of the current collector 11 may be provided with an undercoat layer using graphite or the like.

The active material layer 12 contains at least an active material that can reversibly react with carrier ions such as lithium ions. The average diameter or diameter distribution of the active material particles can be controlled through crushing, granulation, and classification by an appropriate means. The average particle diameter of the active material is less than or equal to 500 nm, preferably greater than or equal to 50 nm and less than or equal to 500 nm.

In the case where the electrode 21 is used as a positive electrode of a secondary battery, a material that allows lithium ions to be inserted or extracted can be used as a positive electrode active material to be contained in the active material layer 12. For example, a lithium-manganese composite oxide with an olivine crystal structure, a layered rock-salt crystal structure, or a spinel crystal structure can be used.

As an example of a lithium-containing complex phosphate with an olivine crystal structure, a composite phosphate represented by a general formula $LiMPO_4$ (M is one or more of Fe(II), Mn(II), Co(II), and Ni(II)) can be given. Typical examples of $LiMPO_4$ include $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Examples of a lithium-containing complex silicate with a layered rock-salt crystal structure include $LiCoO_2$, $LiNiO_2$, $LiMnO_2$, $Li_2MnO_3$, a NiCo-based compound such as $LiNi_{0.8}Co_{0.2}O_2$ (general formula: $LiNi_xCo_{1-x}O_2$ (0<x<1)), a NiMn-based compound such as $LiNi_{0.5}Mn_{0.5}O_2$ (general formula: $LiNi_xMn_{1-x}O_2$ (0<x<1)), a NiMnCo-based compound such as $LiNi_{1/3}Mn_{1/3}Co_{1/3}O_2$ (also referred to as NMC, general formula: $LiNi_xMn_yCo_{1-x-y}O_2$ (x>0, y>0, x+y<1)), $Li(Ni_{0.8}Co_{0.15}Al_{0.05})O_2$, and $Li_2MnO_3$—$LiMO_2$ (M=Co, Ni, or Mn).

Examples of a lithium-manganese composite oxide with a spinel crystal structure include $LiMn_2O_4$, $Li_{1+x}Mn_{2-x}O_4$ (0<x<2), $LiMn_{2-x}Al_xO_4$ (0<x<2), and $LiMn_{1.5}Ni_{0.5}O_4$.

It is preferable to add a small amount of lithium nickel oxide ($LiNiO_2$ or $LiN_{1-x}M_xO_2$ (0<x<1, M=Co, Al, or the like)) to the lithium-manganese composite oxide with a spinel crystal structure (e.g., $LiMn_2O_4$), which contains manganese, in which case the dissolution of manganese and the decomposition of an electrolytic solution can be suppressed, for example.

A composite oxide represented by a general formula $Li_{(2-j)}MSiO_4$ (M is one or more of Fe(II), Mn(II), Co(II), and Ni(II), 0≤j≤2) can also be used as the positive electrode active material. Typical examples of $Li_{(2-j)}MSiO_4$ (general formula) are $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

A nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used as the positive electrode active material. Examples of the nasicon compound include $Fe_2(MnO_4)_3$, $Fe_2(SO_4)_3$, and $Li_3Fe_2(PO_4)_3$. A compound represented by a general formula $Li_2MPO_4F$, $Li_2MP_2O_7$, or $Li_5MO_4$ (M=Fe or Mn), a perovskite fluoride such as $FeF_3$, a metal chalcogenide (a sulfide, a selenide, or a telluride) such as $TiS_2$ or $MoS_2$, a lithium-vanadium-containing composite oxide with an inverse spinel structure such as $LiMVO_4$, a vanadium oxide-based compound (such as $V_2O_5$, $V_6O_{13}$, or $LiV_3O_8$), a manganese oxide, an organic sulfur compound, or the like can be used as the positive electrode active material.

The particle size of the positive electrode active material is preferably, for example, greater than or equal to 5 nm and less than or equal to 100 μm.

A lithium-manganese composite oxide that is represented by a composition formula $Li_xMn_yM_zO_w$ can be used as the positive electrode active material. Here, the element M is preferably silicon, phosphorus, or a metal element other than lithium and manganese, and further preferably nickel. In addition, x/(y+z) is preferably larger than or equal to 0 and smaller than 2, z is larger than 0, and (y+z)/w is preferably larger than or equal to 0.26 and smaller than 0.5. Note that the lithium-manganese composite oxide is an oxide containing at least lithium and manganese, and may contain at least one selected from a group consisting of chromium, cobalt, aluminum, nickel, iron, magnesium, molybdenum, zinc, indium, gallium, copper, titanium, niobium, silicon, phosphorus, and the like. The lithium-manganese composite oxide preferably has a layered rock-salt crystal structure. The lithium-manganese composite oxide may have a layered rock-salt crystal structure and a spinel crystal structure. The average particle diameter of the lithium-manganese composite oxides is preferably greater than or equal to 5 nm and less than or equal to 50 μm, for example.

In the case where carrier ions are alkali metal ions other than lithium ions, or alkaline-earth metal ions, the positive electrode active material may contain, instead of lithium in the lithium compound or the lithium-manganese composite oxide, an alkali metal (e.g., sodium or potassium) or an alkaline-earth metal (e.g., calcium, strontium, barium, beryllium, or magnesium).

In the case where the electrode 21 is used as a negative electrode of a secondary battery, a material that enables charge-discharge reactions by an alloying reaction and a dealloying reaction with lithium can be used as a negative electrode active material to be contained in the active material layer 12.

As an example of the material that enables charge-discharge reactions by an alloying reaction and a dealloying reaction with lithium, a carbon-based material can be given. Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (higher than or equal to 0.1 V and lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

As the material that enables charge-discharge reactions by an alloying reaction and a dealloying reaction with lithium, a material containing at least one of Ga, Si, Al, Ge, Sn, Pb, Sb, Bi, Ag, Zn, Cd, In, and the like can also be given, for example. Such elements have higher capacity than carbon. In particular, silicon has a significantly high theoretical capacity of 4200 mAh/g. Examples of the material containing such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, $InSb$, and $SbSn$.

As the negative electrode active material, an oxide such as SiO, SnO, $SnO_2$, titanium dioxide, a lithium titanium oxide, a lithium-graphite intercalation compound, niobium pentoxide, tungsten oxide, or molybdenum oxide can be used.

Alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case where a material containing lithium ions is used as a positive electrode active material, the nitride containing lithium and a transition metal can be used for the negative electrode active material by extracting the lithium ions contained in the positive electrode active material in advance.

Alternatively, a material which causes a conversion reaction can be used as the negative electrode active material. For example, a transition metal oxide which is not alloyed with lithium, such as cobalt oxide, nickel oxide, or iron oxide may be used as the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The active material layer 12 may further contain a binder for increasing adhesion of active materials, a conductive additive for increasing the conductivity of the active material layer 12, and the like in addition to the above-described active material.

Examples of the binder include polyimide, polytetrafluoroethylene, polyvinyl chloride, an ethylene-propylene-diene polymer, styrene-butadiene rubber, acrylonitrile-butadiene rubber, fluorine rubber, polyvinyl acetate, polymethyl methacrylate, polyethylene, and nitrocellulose, in addition to polyvinylidene fluoride (PVdF) which is a typical example.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (acetylene black (AB)) and graphene. Alternatively, metal powder or metal fibers of copper, nickel, aluminum, silver, gold, or the like, a conductive ceramic material, or the like can be used.

Next, a method for manufacturing the electrode 21 will be described.

The active material layer 12 can be formed by applying a mixture of the above-described active material, binder, conductive additive, and a solvent onto the one side of the sheet-like current collector 11 and then vaporizing the solvent. The friction layer 13 containing the above-described material can be formed on the other side of the current collector 11 by performing CVD, evaporation, or the like. Alternatively, the friction layer 13 can be formed by applying a solution of a material for the above-described organic film or the like onto the other side of the current collector 11 and then vaporizing a solvent.

When the solvent is vaporized from the mixture of the active material, the binder, the conductive additive, and the solvent to form the active material layer 12, the current collector 11 sometimes warps or becomes deformed. It is preferable to form the friction layer 13 on the other side of the current collector 11 prior to the formation of the active material layer 12, in which case the current collector 11 can be reinforced and its warping or deformation can be prevented.

Alternatively, warping or deformation of the current collector 11 can be prevented by concurrently carrying out the formation of the active material layer 12 and the formation of the friction layer 13. That is, application of the mixture of the active material, the binder, the conductive additive, and the solvent onto the one side of the current collector 11 and vaporization of the solvent can be carried out in parallel with application of the solution containing the material of the friction layer 13 onto the other side of the current collector 11 and vaporization of the solvent, whereby the active material layer 12 and the friction layer 13 are formed at the same time.

The provision of the friction layer 13 in the electrode 21 as described in this embodiment can protect the current collector 11 and prevent crack or the like from being formed in the current collector 11. In addition, the provision of the friction layer 13 in the electrode 21 can decrease friction force acting on the surface of the electrode 21. Furthermore, the provision of the friction layer 13 in the electrode 21 can prevent deformation of the current collector 11 and peeling of the active material layer 12 during the manufacturing process of the electrode 21. Moreover, the use of the electrode 21 described in this embodiment as either one or both of a positive electrode and a negative electrode of a secondary battery can make the secondary battery unlikely to deteriorate in capacity and cycle characteristics even when being curved.

In Embodiment 1, one embodiment of the present invention has been described. Other embodiments of the present invention will be described in Embodiments 2 to 9. However, one embodiment of the present invention is not limited to these embodiments. That is, since various embodiments of the present invention are disclosed in Embodiment 1 and Embodiments 2 to 9, one embodiment of the present invention is not limited to a specific embodiment. For example, although an example in which an active material layer is in contact with one side of a current collector and a friction layer is in contact with the other side of the current collector in an electrode has been described as one embodiment of the present invention, one embodiment of the present invention is not limited thereto. Depending on circumstances or conditions, a variety of objects may be in contact with the current collector of the electrode in one embodiment of the present invention. Depending on circumstances or conditions, objects other than the active material layer or the friction layer may be in contact with the current collector of the electrode in one embodiment of the present invention. Depending on circumstances or conditions, the friction layer need not be in contact with the current collector of the electrode in one embodiment of the present invention. Although an example in which one embodiment of the present invention is applied to a lithium-ion secondary battery has been described, one embodiment of the present invention is not limited thereto. Depending on circumstances or conditions, one embodiment of the present invention may be applied to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, and a silver oxide-zinc storage battery, a solid-state battery, an air battery, a zinc-air battery, a primary battery, or capacitors such as an electric double-layer capacitor, an ultracapacitor, a supercapacitor and a lithium ion capacitor. Depending on circumstances or conditions, one embodiment of the present invention need not be applied to a lithium-ion secondary battery or a secondary battery.

This embodiment can be implemented in appropriate combination with any of the other embodiments.

Embodiment 2

In this embodiment, the structure of a secondary battery of one embodiment of the present invention will be described with reference to FIG. 2.

Figure 2:
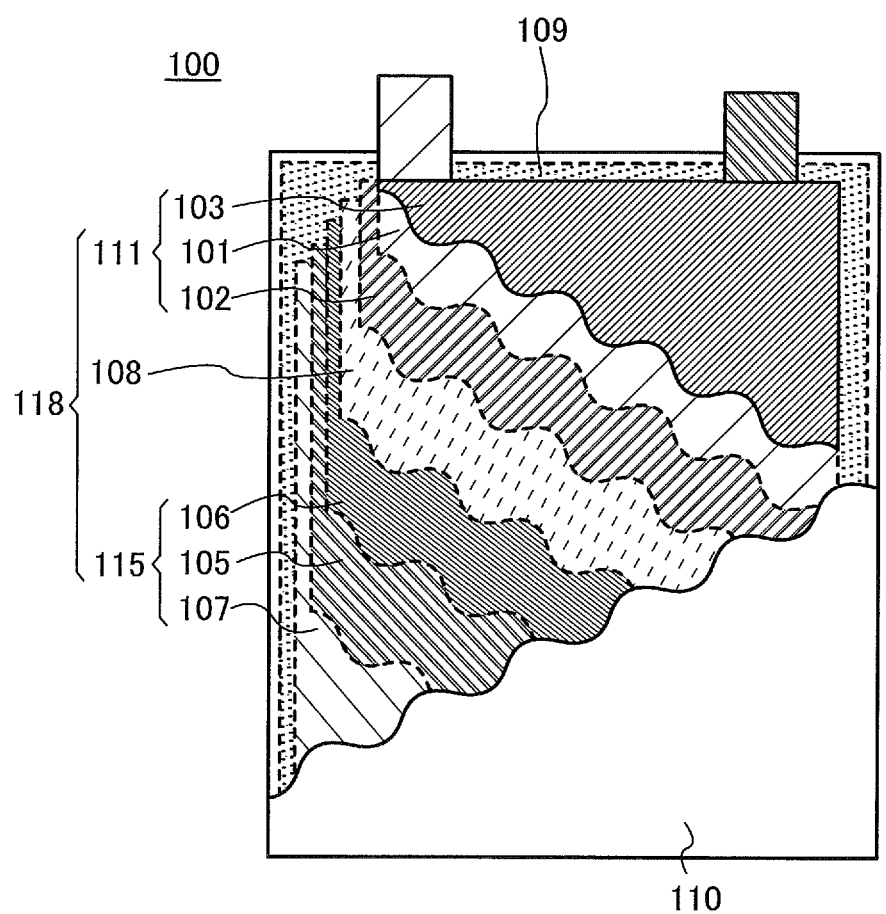
FIG. 2 illustrates a secondary battery of one embodiment of the present invention.

FIG. 2 illustrates a laminate-type secondary battery 100 in which a stack 118 including a positive electrode 111, a negative electrode 115, and a separator 108 is sealed in a flexible exterior body 110 to which an electrolytic solution 109 is injected. When a secondary battery is of a laminate-type, the battery has flexibility and thus is suitable for applications that require flexibility. For example, when a flexible secondary battery is used in electronic equipment at least part of which is flexible, the secondary battery can be curved as the electronic equipment is curved.

In FIG. 2, each of the positive electrode 111 and the negative electrode 115 is the electrode described in Embodiment 1. The positive electrode 111 includes a positive electrode active material layer 102 on one side of a positive electrode current collector 101, and a positive electrode friction layer 103 on the other side of the positive electrode current collector 101. The negative electrode 115 includes a negative electrode active material layer 106 on one side of a negative electrode current collector 105, and a negative electrode friction layer 107 on the other side of the negative electrode current collector 105. In the stack 118, the positive electrode active material layer 102 in the positive electrode 111 and the negative electrode active material layer 106 in the negative electrode 115 face each other with the separator 108 positioned therebetween. Each of the positive electrode friction layer 103 and the negative electrode friction layer 107 is on the outer side of the stack 118 and faces the exterior body 110.

This embodiment is not limited to the example illustrated in FIG. 2. In the case where either one of the positive electrode 111 and the negative electrode 115 is the electrode described in Embodiment 1, friction force acting on the surface of the stack 118 which faces the exterior body 110 can be reduced. Thus, friction force acting on the contact surface between the stack 118 and the exterior body 110 when the secondary battery is curved can be reduced, whereby the exterior body 110 can be prevented from being damaged and safety of the secondary battery 100 against liquid leakage or the like can be improved. Furthermore, the stack 118 can be prevented from being damaged, and a battery of which the capacity and cycle characteristics are unlikely to deteriorate even when being curved can be obtained. In addition, the secondary battery 100 can be prevented from generating heat due to frictional heat.

In the case where either one of the positive electrode 111 and the negative electrode 115 is the electrode described in Embodiment 1, the direction in which the secondary battery 100 is curved may be fixed. For example, given that the stack 118 is easily damaged at the inside of a curve, the electrode described in Embodiment 1 is used as the positive electrode 111 and the direction in which the secondary battery 100 is curved is fixed such that the positive electrode 111 comes inside of the curve.

When the electrode described in Embodiment 1 is used as each of the positive electrode 111 and the negative electrode 115, the direction in which the secondary battery 100 is curved can be freely set by the user, which is preferable.

In the laminate-type secondary battery 100 illustrated in FIG. 2, the positive electrode current collector 101 and the negative electrode current collector 105 also serve as terminals for an electrical contact with the outside. For this reason, each of the positive electrode current collector 101 and the negative electrode current collector 105 is arranged so that part of the positive electrode current collector 101 and part of the negative electrode current collector 105 are exposed outside the exterior body 110.

As the exterior body 110 in the laminate-type secondary battery 100, for example, a laminate film having a three-layer structure where a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide resin, a polyester resin, or the like is provided as the outer surface of the exterior body over the metal thin film can be used. With such a three-layer structure, permeation of an electrolytic solution and a gas can be blocked and an insulating property and resistance to the electrolytic solution can be provided.

The electrode of one embodiment of the present invention can be used as at least one of the negative electrode 115 and the positive electrode 111. The electrode of one embodiment of the present invention may be used as each of the negative electrode 115 and the positive electrode 111. The use of the electrode of one embodiment of the present invention can reduce friction between the electrode and the exterior body 110 which is generated when the secondary battery 100 is curved.

Next, the separator 108 will be described. A separator is provided between a positive electrode and a negative electrode to prevent them from touching each other. The separator includes pores so as not to prevent the transfer of ions between the positive electrode and the negative electrode. Electrolytes other than a solid can pass through the pores. The state of the separator is preferably unlikely to change with a usage environment of the power storage device, even in a high-temperature environment. The change in state is acceptable as long as the positive electrode and the negative electrode are not in contact with each other.

As the separator 108, paper; nonwoven fabric; glass fiber; ceramics; synthetic fiber containing nylon (polyamide), vinylon (polyvinyl alcohol-based fiber), polyester, acrylic, polyolefin, or polyurethane; or the like can be used.

The separator 108 is preferably provided so as to enclose either one of the positive electrode 111 and the negative electrode 115. For example, the separator 108 is folded in half such that the negative electrode 115 is sandwiched, and sealed in a region outside the region overlapping with the negative electrode 115; thus, the negative electrode 115 can be enclosed by the separator 108. Then, the positive electrode 111 and the negative electrode 115 enclosed by the separator 108 are alternately stacked and surrounded by the exterior body 110, whereby the laminate-type secondary battery 100 can be fabricated.

The electrolytic solution 109 will be described. The electrolytic solution 109 contains at least an electrolyte and a solvent. As the electrolyte of the electrolytic solution 109, a material in which carrier ions can be transferred is used. In the case where carrier ions are lithium ions, for example, a material containing lithium ions is used. Typical examples of the electrolyte include lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, $LiN(C_2F_5SO_2)_2$, and the like. One of these electrolytes may be used alone or two or more of them may be used in an appropriate combination and in an appropriate ratio.

In the case where carrier ions are alkali metal ions other than lithium ions, or alkaline-earth metal ions, a compound containing carriers such as an alkali metal (e.g., sodium and potassium) or an alkaline-earth metal (e.g., calcium, strontium, barium, beryllium, and magnesium) instead of lithium of the lithium compound, the lithium-containing complex phosphate, or the lithium-containing complex silicate may be used as the positive electrode active material.

As the solvent of the electrolytic solution 109, a material in which carrier ions can transfer is used. As the solvent, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Polymer may be added to the electrolytic solution 109 so that the electrolytic solution 109 becomes gelled. The electrolytic solution 109 being gelled has higher safety against liquid leakage or the like. Furthermore, a secondary battery can be thinner and more lightweight. As the polymer capable of making the electrolytic solution 109 gelled, a polyalkylene oxide-based polymer, a polyacrylonitrile-based polymer, a polyvinylidene fluoride-based polymer, a polyacrylate based polymer, or a polymethacrylate-based polymer can be used. Note that in this specification and the like, the term polyvinylidene fluoride-based polymer, for example, refers to a polymer containing polyvinylidene fluoride, and includes a poly(vinylidene fluoride-hexafluoropropylene) copolymer and the like in its category. The formed polymer may be porous.

The above polymer can be qualitatively analyzed using a Fourier transform infrared (FT-IR) spectrometer or the like. For example, the polyvinylidene fluoride-based polymer has an absorption peak showing a C—F bond in a spectrum obtained by the FT-IR spectrometer. The polyacrylonitrile-based polymer has an absorption peak showing a C≡N bond in a spectrum obtained by the FT-IR spectrometer.

Alternatively, the use of one or more ionic liquids (room temperature molten salts) which are less likely to burn and volatilize as the solvent of the electrolytic solution 109 can prevent the secondary battery from exploding or catching fire even when the secondary battery internally shorts out or the internal temperature increases due to overcharging or the like. An ionic liquid includes a cation and an anion, specifically, an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, tetrafluoroborate, perfluoroalkylborate, hexafluorophosphate, and perfluoroalkylphosphate.

The electrolytic solution 109 is preferably highly purified and contains a negligible amount of dust particles and elements other than the constituent elements of the electrolytic solution (hereinafter, also simply referred to as impurities). Specifically, the weight ratio of impurities in the electrolytic solution is less than or equal to 1%, preferably less than or equal to 0.1%, and more preferably less than or equal to 0.01%.

An additive agent such as vinylene carbonate, propane sultone (PS), tert-butylbenzene (TBB), fluoroethylene carbonate (FEC), or LiBOB may be added to the electrolytic solution 109. The concentration of such an additive agent in the whole solvent is, for example, higher than or equal to 0.1 wt % and lower than or equal to 5 wt %.

Instead of the electrolytic solution 109, a solid electrolyte containing an inorganic material such as a sulfide-based inorganic material or an oxide-based inorganic material may be used. In the case where the solid electrolyte is used, a separator or a spacer is not necessary. Furthermore, in the case where a solid electrolyte or a gelled electrolyte is used, the battery can be entirely solidified or gelled; therefore, there is no possibility of liquid leakage and thus the safety of the battery is dramatically increased.

Although FIG. 2 shows an example in which a pair of the positive electrode and the negative electrode facing each other is provided, the number of pairs of electrodes is not limited to one and may be two or more. With a larger number of electrode layers, a secondary battery can have higher capacity. In contrast, with a smaller number of electrode layers, a secondary battery can have smaller thickness and higher flexibility.

This embodiment can be implemented in appropriate combination with any of the other embodiments.

Embodiment 3

In this embodiment, a power storage device of one embodiment of the present invention will be described with an example of the secondary battery, with reference to FIGS. 3A and 3B, FIGS. 4A to 4C, FIG. 5, FIGS. 6A to 6C, FIGS. 7A and 7B, FIGS. 8A and 8B, FIGS. 9A and 9B, FIG. 10, FIGS. 11A and 11B, and FIG. 12.

As described in Embodiment 2, the secondary battery 100 includes the stack 118 including the positive electrode 111, the negative electrode 115, and the separator 108; the exterior body; and the electrolytic solution. In this embodiment, examples of the structure of the stack 118 will be described.

For the description of the positive electrode 111 and the negative electrode 115 in this embodiment, Embodiment 1 can be referred to. For the description of the separator 108 and the electrolytic solution 109, Embodiment 2 can be referred to.

Note that in this embodiment, the positive electrode 111 and the negative electrode 115 may be interchanged with each other as appropriate.

Structural Example 1

Figure 3A:
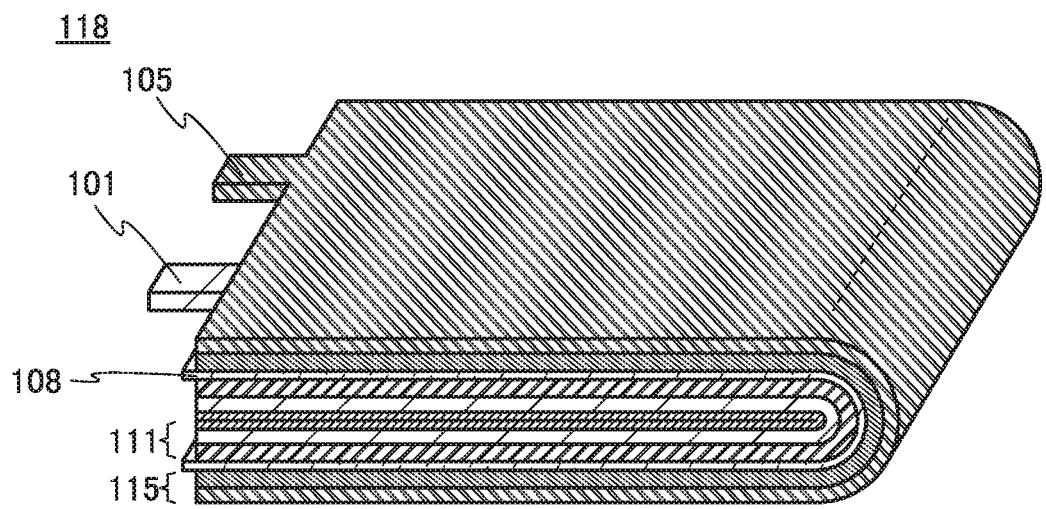
FIGS. 3A and 3B illustrate a stack in a secondary battery of one embodiment of the present invention.
Figure 3B:
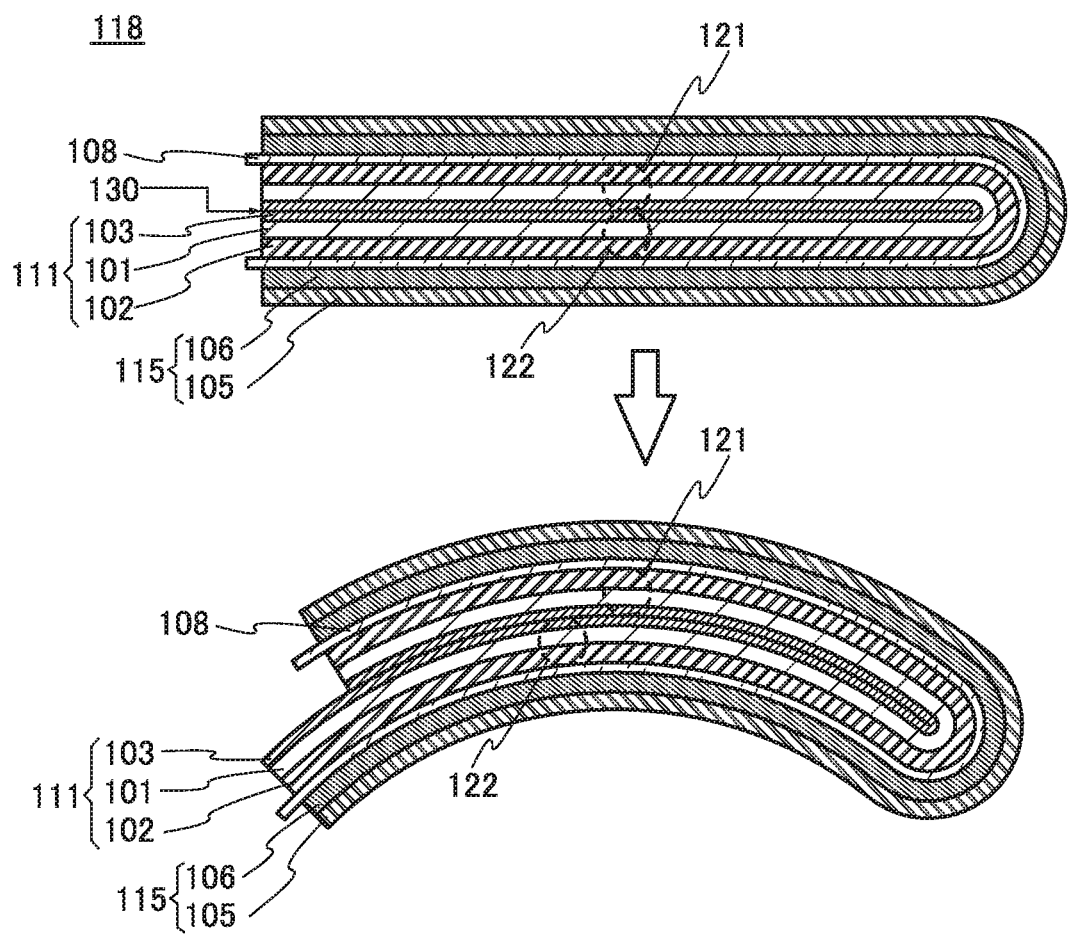

FIGS. 3A and 3B illustrate an example of the structure of the stack 118. FIG. 3A shows a perspective view of the stack 118, and FIG. 3B, FIGS. 4A to 4C, FIG. 5, FIGS. 6A to 6C, and FIGS. 7A and 7B show side views of the stack 118 of Structural Example 1.

FIGS. 3A and 3B show the stack 118 having a bifold structure in which the positive electrode 111, the separator 108, and the negative electrode 115 are stacked and then bent once in such a manner that a first portion 121 and a second portion 122 of the positive electrode 111 face each other. With the bifold structure, the surface area of the stack 118 can be reduced, which is preferable. Thus, the size of the secondary battery 100 can be reduced.

When the secondary battery 100 including the stack 118 is curved by an externally applied force, the stack 118 is also curved. FIG. 3B shows the stack 118 before and after being curved. When the stack 118 is curved, stress is generated because of the difference between the inner diameter and outer diameter of the curve; however, the stress can be relieved owing to displacement of the first portion 121 and the second portion 122 of the positive electrode 111 from each other.

As shown in FIG. 3B, the positive electrode 111 includes the positive electrode current collector 101, the positive electrode active material layer 102, and the positive electrode friction layer 103, and the negative electrode 115 includes the negative electrode current collector 105 and the negative electrode active material layer 106. The positive electrode active material layer 102 and the negative electrode active material layer 106 face each other with the separator 108 positioned therebetween. The first portion 121 and the second portion 122 each include the positive electrode current collector 101, the positive electrode active material layer 102, and the positive electrode friction layer 103. Since the surface of the positive electrode current collector 101 is protected by the positive electrode friction layer 103, the positive electrode current collector 101 can be prevented from being damaged by friction when the first portion 121 and the second portion 122 of the positive electrode 111 slide on each other.

It is preferable that friction force acting between the surface of the positive electrode friction layer 103 and a surface in contact with the positive electrode friction layer 103 be smaller than friction force acting between the surface of the positive electrode current collector 101 and a surface in contact with the positive electrode current collector 101, because stress caused by the difference between the inner diameter and outer diameter of the curve can be more easily relieved. More specifically, it is preferable that the coefficient of static friction between the positive electrode friction layer 103 in the first portion 121 and the positive electrode friction layer 103 in the second portion 122 be smaller than the coefficient of static friction between the positive electrode current collector 101 in the first portion 121 and the positive electrode current collector 101 in the second portion 122. With such a structure, the first portion 121 and the second portion 122 can easily slide on each other, and stress caused by the difference between the inner diameter and outer diameter of the curve when the stack 118 is curved can be easily relieved. Accordingly, a locally steep curve of the positive electrode 111 when curving the secondary battery can be prevented, whereby peeling of the positive electrode active material layer 102 from the positive electrode current collector 101, rupture of the positive electrode current collector 101, or the like can be prevented. Thus, the secondary battery 100 of which the capacity and cycle characteristics are unlikely to deteriorate even when the secondary battery 100 is curved can be obtained.

Note that although FIGS. 3A and 3B illustrate an example of the stack 118 having the bifold structure in which the positive electrode 111 with the positive electrode friction layer 103 is on the inner side of the fold, one embodiment of the present invention is not limited thereto. The stack 118 may have a bifold structure in which the positive electrode 111 does not include the positive electrode friction layer 103 and the negative electrode 115 with the negative electrode friction layer 107 is on the inner side of the fold.

Figure 4A:
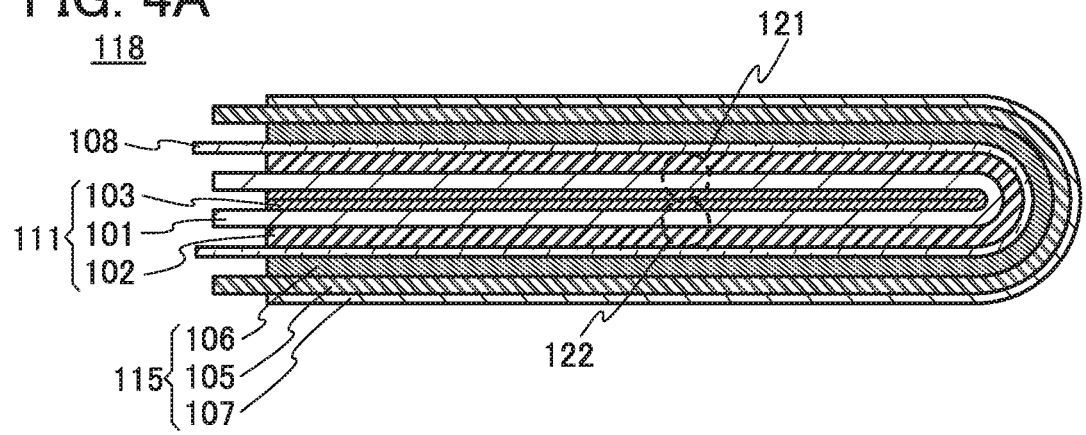
FIGS. 4A to 4C each illustrate a stack in a secondary battery of one embodiment of the present invention.
Figure 4B:
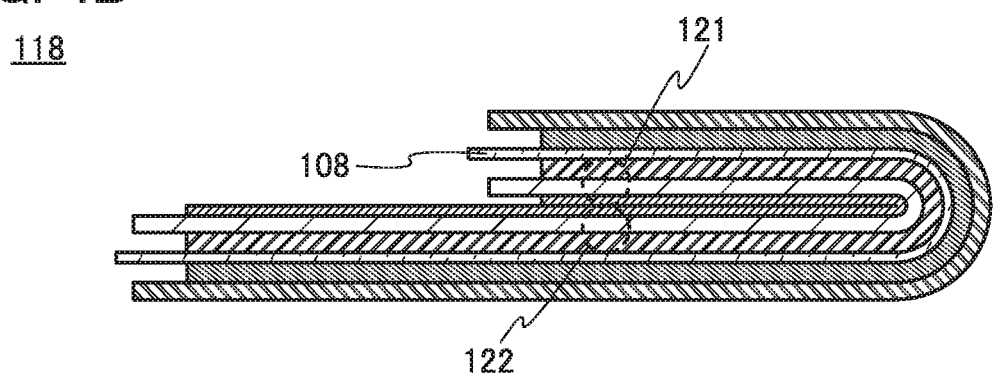
Figure 4C:
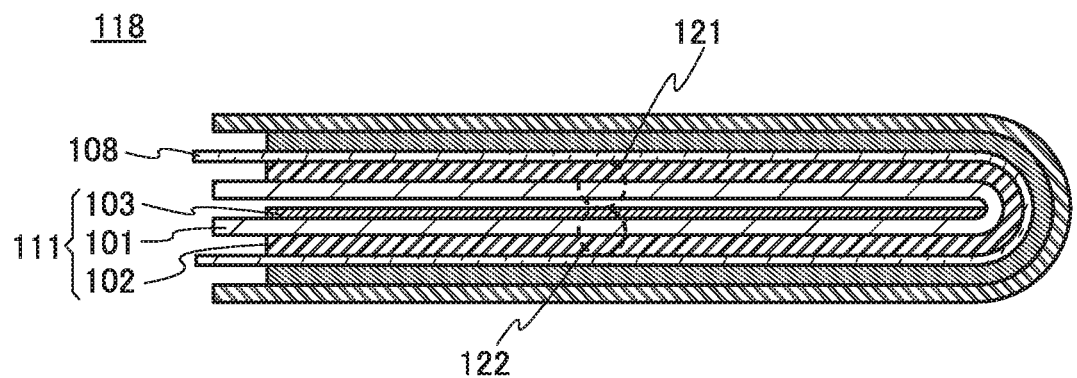

Other examples of the structure of the stack 118 are shown in FIGS. 4A to 4C. The stack 118 shown in FIG. 4A is different from the stack shown in FIGS. 3A and 3B in that the negative electrode 115 includes the negative electrode friction layer 107 in addition to the negative electrode current collector 105 and the negative electrode active material layer 106.

With the structure shown in FIG. 4A, the first portion 121 and the second portion 122 each include the positive electrode friction layer 103, and the negative electrode friction layer 107 is positioned on the outer side of the stack 118. Accordingly, this structure can reduce friction between the first portion 121 and the second portion 122 of the positive electrode 111 which is generated when the secondary battery is curved. In addition, friction between the negative electrode 115 and the exterior body 110 can be reduced.

Note that although FIGS. 3A and 3B and FIG. 4A illustrate examples of the bifold structure in which the stack 118 is folded such that one end of the stack 118 is approximately in line with the other end of the stack 118, one embodiment of the present invention is not limited thereto. As shown in FIG. 4B, the stack 118 may be folded such that one end of the stack 118 is not in line with the other end of the stack 118. Even with such a structure, the first portion 121 and the second portion 122 slide on each other when the stack 118 is curved, whereby stress caused by the difference between the inner diameter and outer diameter of the curve can be relieved.

In the positive electrode 111, the positive electrode friction layer 103 may cover only part of the surface of the positive electrode current collector 101. In the stack 118 shown in FIG. 4C, the positive electrode 111 includes the first portion 121 and the second portion 122. The first portion 121 includes the positive electrode current collector 101 and the positive electrode active material layer 102, and the second portion 122 includes the positive electrode current collector 101, the positive electrode active material layer 102, and the positive electrode friction layer 103. Thus, when the first portion 121 and the second portion 122 come in contact with each other, the positive electrode current collector 101 in the first portion 121 comes in contact with the positive electrode friction layer 103 in the second portion 122. Even with such a structure, the first portion 121 and the second portion 122 easily slide on each other.

Note that the structure shown in FIG. 4C is preferably employed in the case where the positive electrode friction layer 103 is formed using a material that can make the coefficient of static friction between the positive electrode friction layer 103 and the positive electrode current collector 101 smaller than the coefficient of static friction between the positive electrode friction layers 103.

Figure 5:
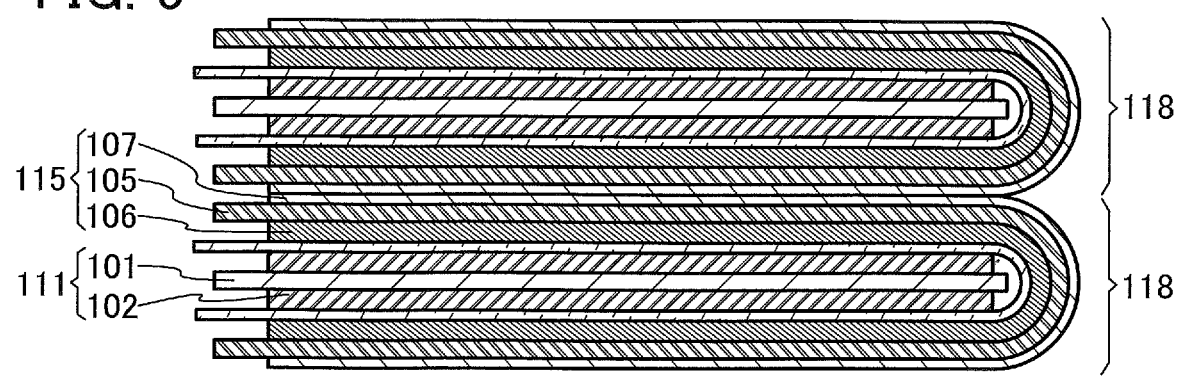
FIG. 5 illustrates stacks in a secondary battery of one embodiment of the present invention.

As shown in FIG. 5, a plurality of stacks 118 may be stacked. With such a structure, the capacity of the secondary battery 100 can increase. The two stacks 118 overlap with each other such that two negative electrode friction layers 107 are in contact with each other in this structure. Accordingly, friction between the stacks 118 in curving the secondary battery 100 can be reduced and stress caused by the difference between the inner diameter and outer diameter of the curve can be easily relieved. In addition, the stacks 118 can be resistant to damage. Furthermore, a locally steep curve of the negative electrode 115 when curving the secondary battery can be prevented, whereby peeling of the negative electrode active material layer 106 from the negative electrode current collector 105 can be prevented.

In the stack 118, the positive electrode 111 may include the positive electrode active material layer 102 on each side of the positive electrode current collector 101 as shown in FIG. 5. With such a structure, the capacity of the secondary battery 100 can increase.

Figure 6A:
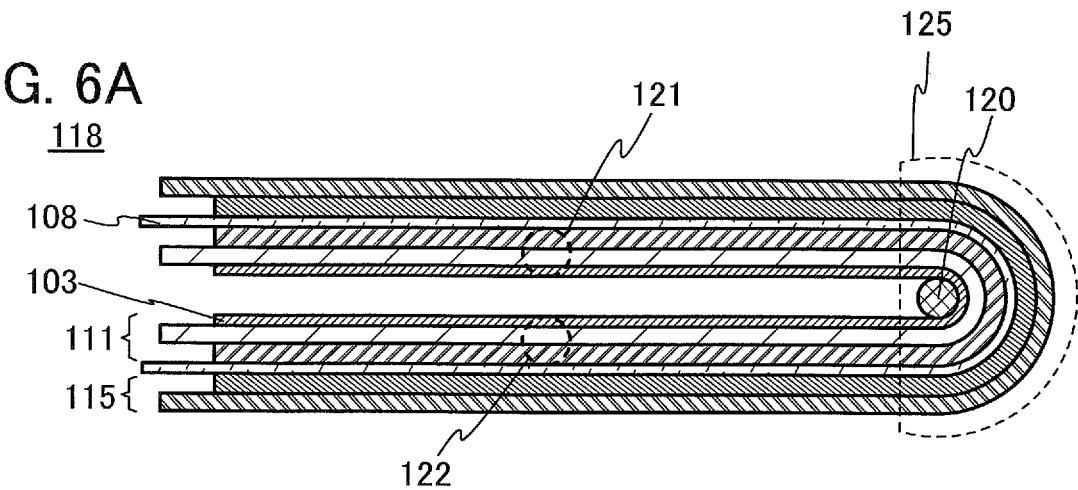
FIGS. 6A to 6C each illustrate a stack in a secondary battery of one embodiment of the present invention.
Figure 6B:
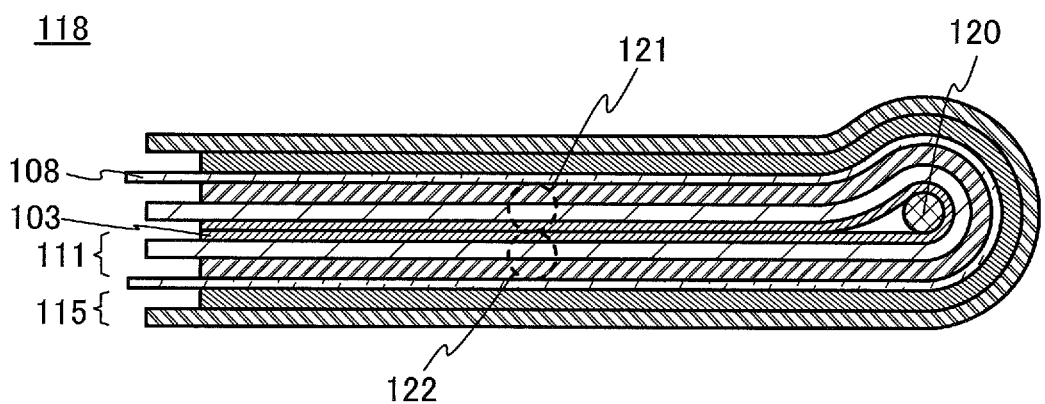

FIGS. 6A and 6B illustrate the stack 118 with a structure in which the positive electrode 111 including the positive electrode friction layer 103, the separator 108, and the negative electrode 115 are stacked and the stack is bent to wrap an axis 120 at a bend portion 125. With the axis 120, the curvature radius of each of the positive electrode 111, the negative electrode 115, and the separator 108 at the bend portion 125 can increase. Accordingly, peeling of the active material layers from the current collectors caused by local bending of the positive electrode 111 and the negative electrode 115 at the bend portion 125 can be prevented.

Note that an example in which the first portion 121 and the second portion 122 of the positive electrode friction layer 103 face each other but are not in contact with each other is shown in FIG. 6A; in fact, the positive electrode friction layer 103 in the first portion 121 and the positive electrode friction layer 103 in the second portion 122 can be in contact with each other as shown in FIG. 6B.

Figure 6C:
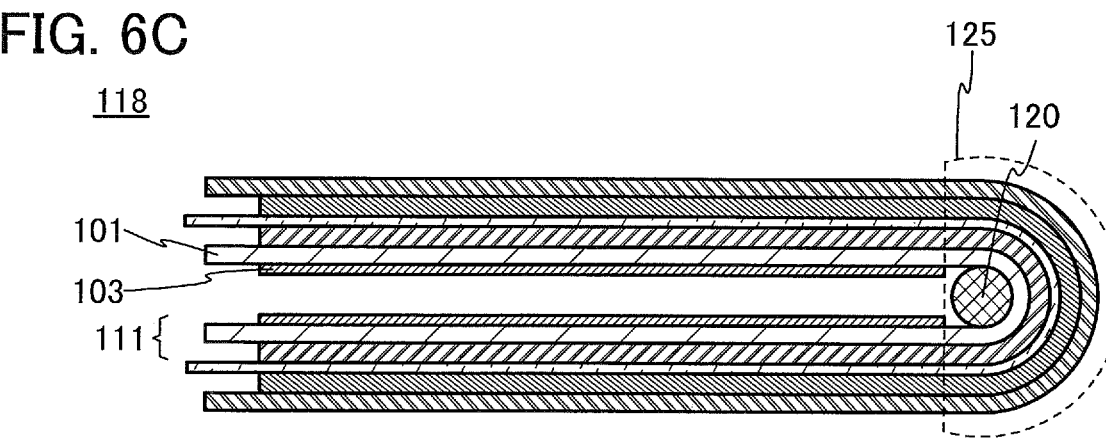

FIG. 6C illustrates an example in which the positive electrode friction layer 103 is not provided near the bend portion 125 where the positive electrode 111 is in contact with the axis 120. In the case where the coefficient of static friction between the axis 120 and the positive electrode current collector 101 is smaller than the coefficient of static friction between the axis 120 and the positive electrode friction layer 103, it is preferable that the positive electrode friction layer 103 be not provided near the bend portion 125, since the secondary battery including the stack 118 can be more easily curved then.

Figure 7A:
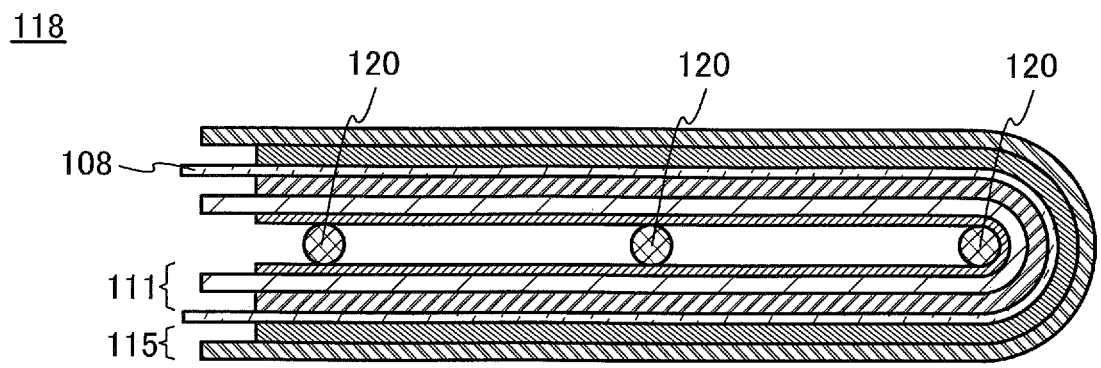
FIGS. 7A and 7B each illustrate a stack in a secondary battery of one embodiment of the present invention.
Figure 7B:
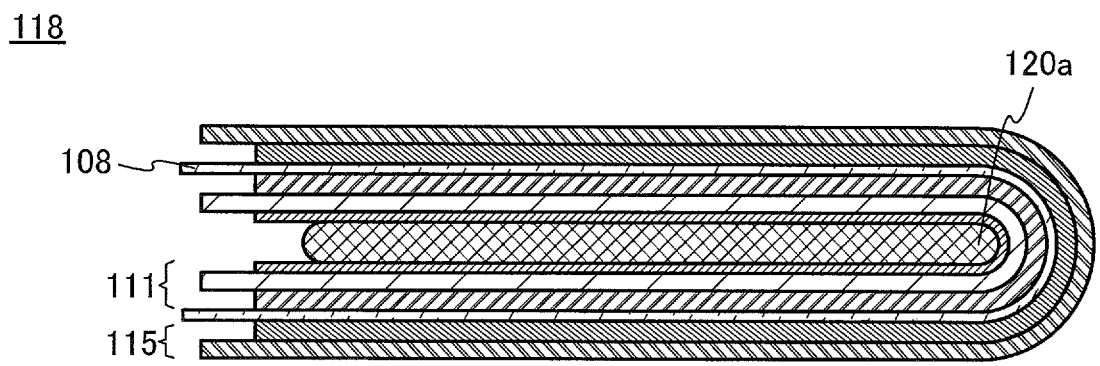

As illustrated in FIG. 7A, the stack 118 may have a structure in which the positive electrode 111, the negative electrode 115, and the separator 108 are bent to wrap a plurality of axes 120. The shape of the axis 120 is not limited to a cylinder shape. As illustrated in FIG. 7B, a plate-like component 120a may also be used.

Structural Example 2

As Structural Example 2, the stack 118 with an accordion fold structure will be described with reference to FIGS. 8A and 8B, FIGS. 9A and 9B, and FIG. 10.

Figure 8A:
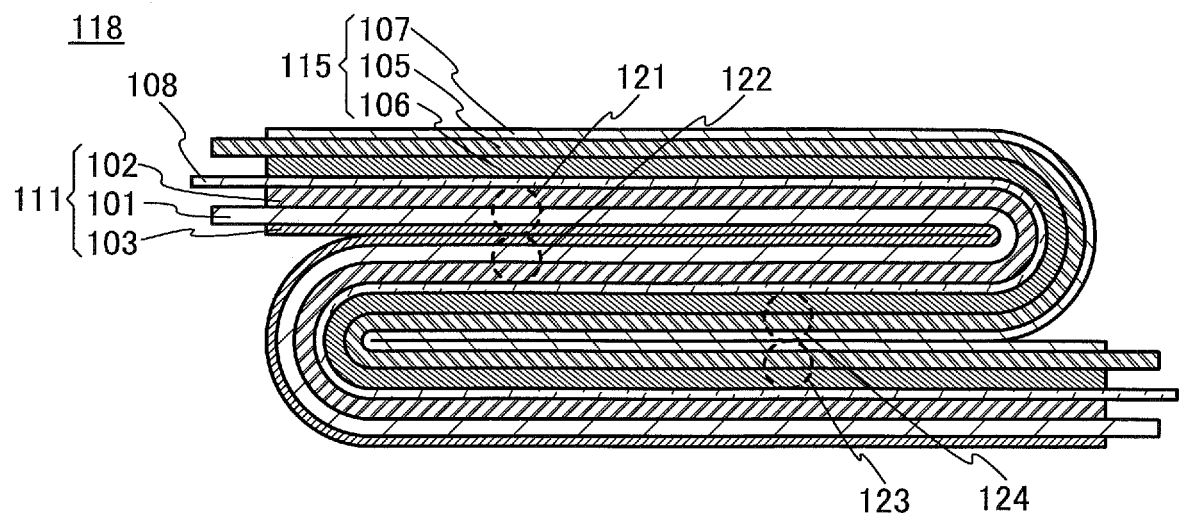
FIGS. 8A and 8B each illustrate a stack in a secondary battery of one embodiment of the present invention.
Figure 8B:
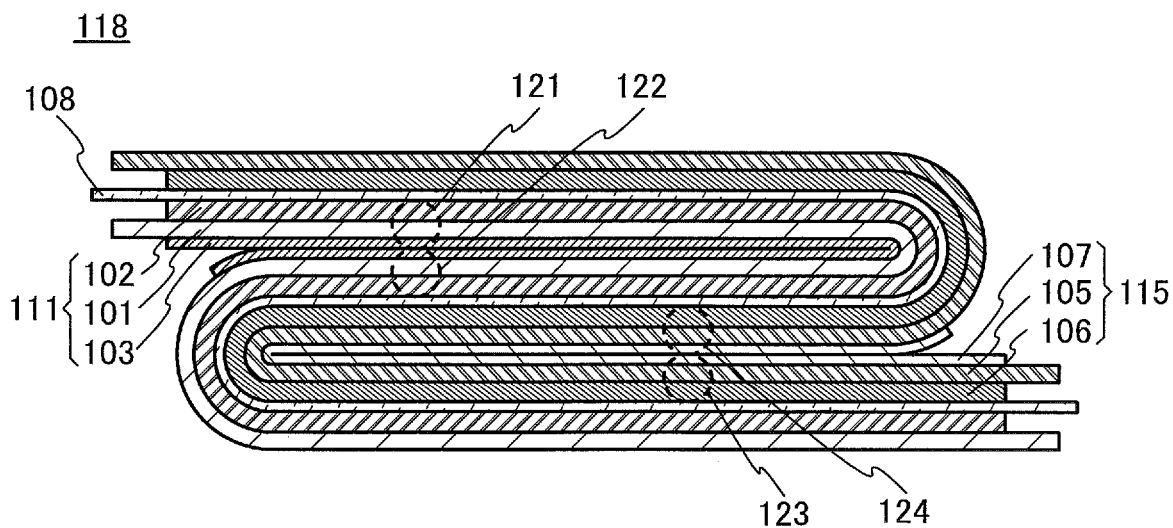

FIGS. 8A and 8B each show the stack 118 with a trifold structure in which the positive electrode 111, the separator 108, and the negative electrode 115 are stacked and folded twice. The positive electrode 111 includes the positive electrode current collector 101, the positive electrode active material layer 102, and the positive electrode friction layer 103. The negative electrode 115 includes the negative electrode current collector 105, the negative electrode active material layer 106, and the negative electrode friction layer 107.

The positive electrode 111 includes the first portion 121 and the second portion 122 each of which includes the positive electrode current collector 101, the positive electrode active material layer 102, and the positive electrode friction layer 103. The negative electrode 115 includes a third portion 123 and a fourth portion 124 each of which includes the negative electrode current collector 105, the negative electrode active material layer 106, and the negative electrode friction layer 107. In the stack 118, the first portion 121 and the second portion 122 of the positive electrode 111 are in contact with each other, and the third portion 123 and the fourth portion 124 of the negative electrode 115 are in contact with each other.

When the stack 118 is curved, stress is caused by the difference between the inner diameter and outer diameter of the curve. However, the stress can be relieved because the first portion 121 and the second portion 122 of the positive electrode 111 slide on each other and the third portion 123 and the fourth portion 124 of the negative electrode 115 slide on each other.

It is preferable that friction force acting on the contact surface between the surface of the positive electrode friction layer 103 and another surface be smaller than friction force acting on the contact surface between the positive electrode current collector 101 and another surface, in which case stress caused by the difference between the inner diameter and outer diameter of the curve can be easily relieved. Furthermore, it is preferable that friction force acting on the contact surface between the surface of the negative electrode friction layer 107 and another surface be smaller than friction force acting on the contact surface between the negative electrode current collector 105 and another surface, in which case stress caused by the difference between the inner diameter and outer diameter of the curve can be easily relieved.

More specifically, it is preferable that the coefficient of static friction between the positive electrode friction layer 103 in the first portion 121 and the positive electrode friction layer 103 in the second portion 122 be smaller than the coefficient of static friction between the positive electrode current collector 101 in the first portion 121 and the positive electrode current collector 101 in the second portion 122. With such a structure, the first portion 121 and the second portion 122 can easily slide on each other, and stress caused by the difference between the inner diameter and outer diameter of the curve when the stack 118 is curved can be easily relieved.

Furthermore, it is preferable that the coefficient of static friction between the negative electrode friction layer 107 in the third portion 123 and the negative electrode friction layer 107 in the fourth portion 124 be smaller than the coefficient of static friction between the negative electrode current collector 105 in the third portion 123 and the negative electrode current collector 105 in the fourth portion 124. With such a structure, the third portion 123 and the fourth portion 124 can easily slide on each other, and stress caused by the difference between the inner diameter and outer diameter of the curve when the stack 118 is curved can be easily relieved. Accordingly, a locally steep curve of the positive electrode 111 and the negative electrode 115 when curving the secondary battery can be prevented, whereby peeling of the positive electrode active material layer 102 from the positive electrode current collector 101, peeling of the negative electrode active material layer 106 from the negative electrode current collector 105, rupture of the positive electrode current collector 101 or the negative electrode current collector 105, or the like can be prevented.

Note that the positive electrode friction layer 103 is in contact with the entire surface of the positive electrode current collector 101 and the negative electrode friction layer 107 is in contact with the entire surface of the negative electrode current collector 105 in the stack 118 shown in FIG. 8A; however, the friction layer need not necessarily be provided on the entire surface of the current collector. As shown in FIG. 8B, the positive electrode friction layer 103 may be provided only in the area that includes the first portion 121 and the second portion 122 of the positive electrode 111. Similarly, the negative electrode friction layer 107 may be provided on the negative electrode current collector 105 only in the area that includes the third portion 123 and the fourth portion 124 of the negative electrode 115. With such a structure, the area of the friction layer in the electrode can be reduced, whereby the manufacturing cost of the electrode can be cut down.

Figure 9A:
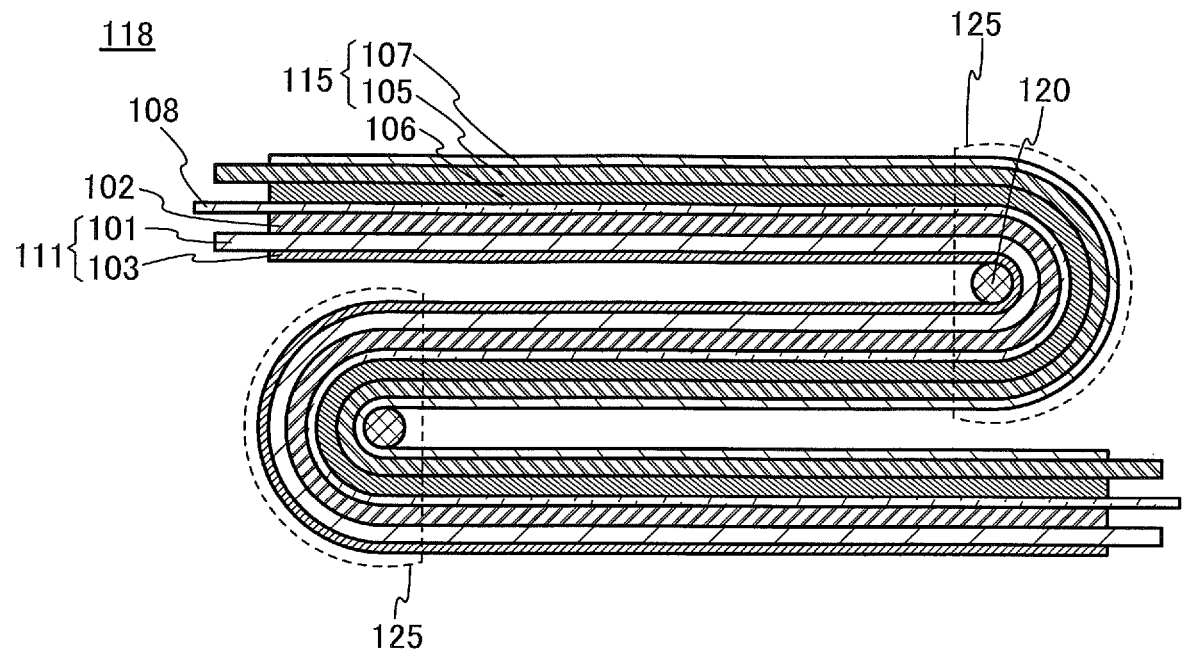
FIGS. 9A and 9B each illustrate a stack in a secondary battery of one embodiment of the present invention.
Figure 9B:
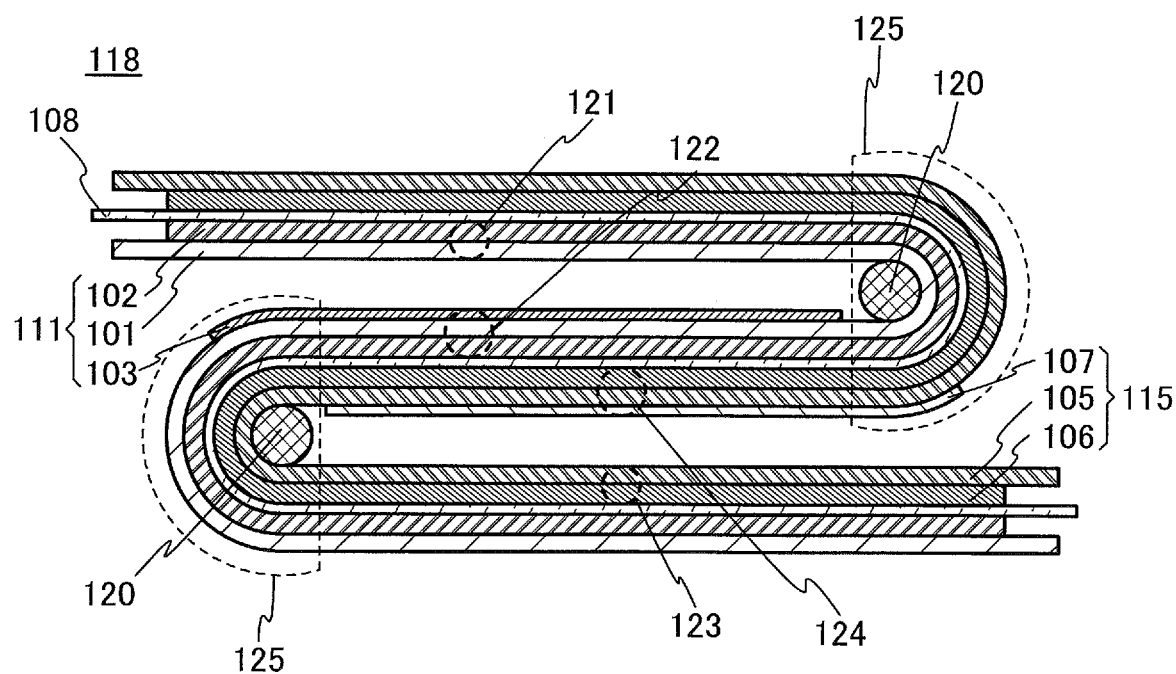

FIGS. 9A and 9B each show the stack 118 with a trifold structure in which the positive electrode 111, the separator 108, and the negative electrode 115 are stacked and the axes 120 are wrapped at two bend portions 125. With the axes 120, the curvature radius of bending of each of the positive electrode 111, the negative electrode 115, and the separator 108 at the bend portions 125 can increase. Accordingly, peeling of the active material layer from the current collector caused by local bending of the positive electrode 111 and the negative electrode 115 at the bend portions 125 can be prevented.

The positive electrode friction layer 103 is in contact with the entire surface of the positive electrode current collector 101 and the negative electrode friction layer 107 is in contact with the entire surface of the negative electrode current collector 105 in the stack 118 shown in FIG. 9A; however, the friction layer need not necessarily be provided on the entire surface of the current collector. In the structure shown in FIG. 9B, the positive electrode friction layer 103 is provided only on a portion of the positive electrode current collector 101 which is potentially in contact with another portion of the positive electrode current collector 101, and the negative electrode friction layer 107 is provided only on a portion of the negative electrode current collector 105 which is potentially in contact with another portion of the negative electrode current collector 105. It is preferable to employ this structure in the case where the coefficient of static friction between the axis 120 and the positive electrode current collector 101 is smaller than the coefficient of static friction between the axis 120 and the positive electrode friction layer 103 and the coefficient of static friction between the axis 120 and the negative electrode current collector 105 is smaller than the coefficient of static friction between the axis 120 and the negative electrode friction layer 107, because the secondary battery with the stack 118 can be more easily curved. Furthermore, the areas of the positive electrode friction layer 103 and the negative electrode friction layer 107 can be reduced, whereby the manufacturing cost of the electrode can be cut down.

In FIG. 9B, the first portion 121 of the positive electrode 111 includes the positive electrode current collector 101 and the positive electrode active material layer 102, and the second portion 122 of the positive electrode 111 includes the positive electrode current collector 101, the positive electrode active material layer 102, and the positive electrode friction layer 103. The third portion 123 of the negative electrode 115 includes the negative electrode current collector 105 and the negative electrode active material layer 106, and the fourth portion 124 of the negative electrode 115 includes the negative electrode current collector 105, the negative electrode active material layer 106, and the negative electrode friction layer 107. With such a structure, the positive electrode current collector 101 in the first portion 121 and the positive electrode friction layer 103 in the second portion 122 can be in contact with each other. Furthermore, the negative electrode current collector 105 in the third portion 123 and the negative electrode friction layer 107 in the fourth portion 124 can be in contact with each other.

In the case where the structure shown in FIG. 9B is employed, it is preferable that the coefficient of static friction between the positive electrode current collector 101 in the first portion 121 and the positive electrode friction layer 103 in the second portion 122 be smaller than the coefficient of static friction between the positive electrode current collector 101 in the first portion 121 and the positive electrode current collector 101 in the second portion 122, because the first portion 121 and the second portion 122 can slide on each other more easily then. In addition, it is preferable that the coefficient of static friction between the negative electrode current collector 105 in the third portion 123 and the negative electrode friction layer 107 in the fourth portion 124 be smaller than the coefficient of static friction between the negative electrode current collector 105 in the third portion 123 and the negative electrode current collector 105 in the fourth portion 124, because the third portion 123 and the fourth portion 124 can slide on each other more easily then.

Note that the stacks 118 shown in FIGS. 8A and 8B and FIGS. 9A and 9B each have an accordion fold structure in which the positive electrode 111, the separator 108, and the negative electrode 115 are stacked and bent twice; however, an accordion fold structure in which the positive electrode 111, the separator 108, and the negative electrode 115 are stacked and bent three times as shown in FIG. 10 may also be employed, for example. Furthermore, an accordion fold structure in which the stack is bent four or more times may also be employed. The more times the positive electrode 111, the separator 108, and the negative electrode 115 are bent, the smaller the size of the stack 118 can be. In addition, the secondary battery 100 with the stack 118 can be reduced in size.

Structural Example 3

Figure 11A:
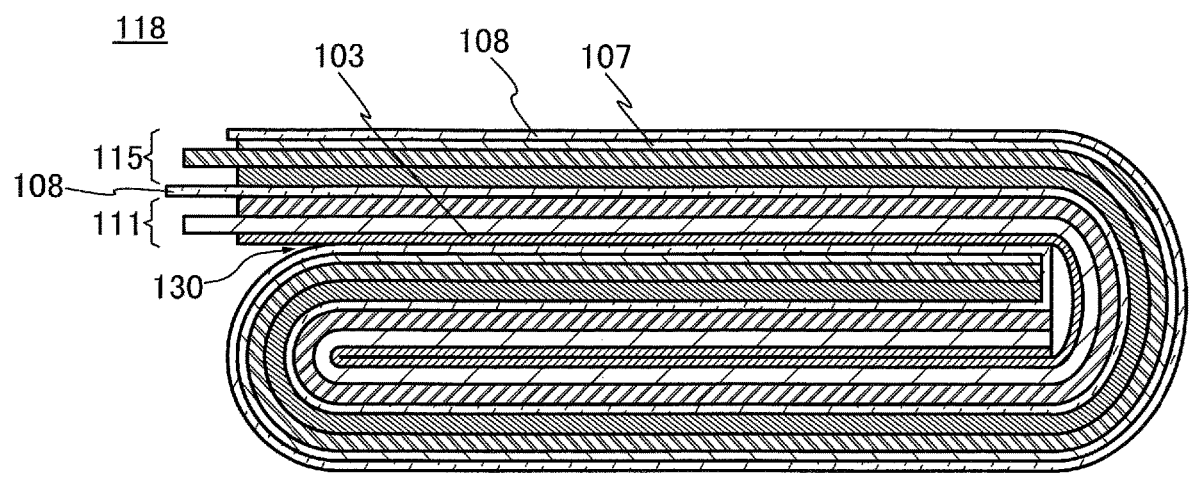
FIGS. 11A and 11B each illustrate a stack in a secondary battery of one embodiment of the present invention.
Figure 11B:
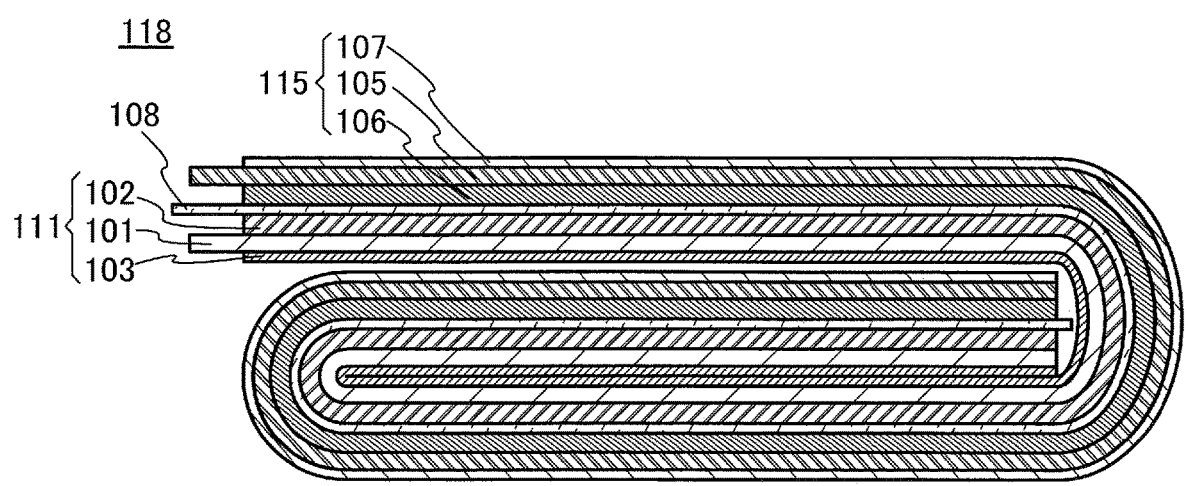

FIGS. 11A and 11B each show a side view of the stack 118 having a structure in which the positive electrode 111, the separator 108, and the negative electrode 115 are stacked and wound. With a wound structure, the size of the stack 118 can be smaller, whereby the secondary battery can also be reduced in size.

In the stack 118 shown in FIG. 11A, the separator 108 covers the negative electrode 115, so that the positive electrode 111 and the negative electrode 115 can be prevented from being in contact with each other and short-circuited.

In the stack 118 shown in FIG. 11A, the separator 108 is in contact with the positive electrode friction layer 103 at a contact surface 130. When the stack 118 is curved, stress caused by the difference between the inner diameter and outer diameter of the curve can be relieved because the separator 108 and the positive electrode 111 slide on the contact surface 130. Accordingly, it is preferable that the coefficient of static friction between the positive electrode friction layer 103 and the separator 108 be smaller than the coefficient of static friction between the positive electrode current collector 101 and the separator 108, in which case the positive electrode 111 and the separator 108 can slide on the contact surface 130 more easily.

In the case where the positive electrode friction layer 103 and the negative electrode friction layer 107 each have an insulating property, the negative electrode 115 need not be covered with the separator 108. In FIG. 11B, the positive electrode 111 includes the positive electrode current collector 101, the positive electrode active material layer 102, and the positive electrode friction layer 103 with an insulating property, and the negative electrode 115 includes the negative electrode current collector 105, the negative electrode active material layer 106, and the negative electrode friction layer 107 with an insulating property. With such a structure, even when the stack 118 is wound and the positive electrode 111 and the negative electrode 115 come in contact with each other, short-circuiting can be prevented from occurring since it is between the positive electrode friction layer 103 and the negative electrode friction layer 107 each having an insulating property where the contact is actually made.

Note that although the stack 118 with a structure in which the positive electrode 111, the separator 108, and the negative electrode 115 are stacked and wound one and a half times is shown in each of FIGS. 11A and 11B, the stack 118 may be wound two or more times. The more times the stack 118 is wound, the smaller the size of the stack 118 can be. In addition, the secondary battery with the stack 118 can be reduced in size.

Structural Example 4

Next, the stack 118 having a structure different from the above will be described with reference to FIG. 12.

Figure 12:
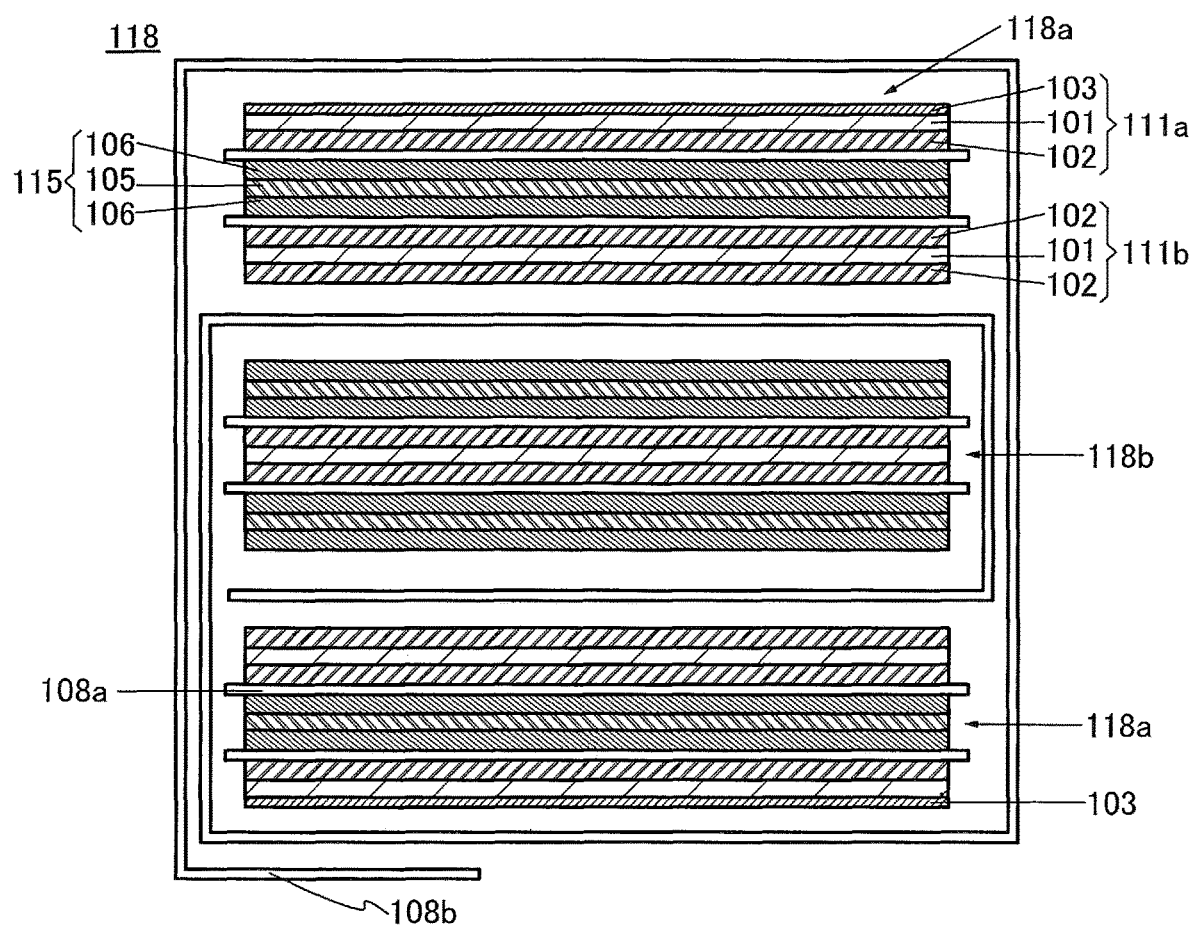
FIG. 12 illustrates a stack in a secondary battery of one embodiment of the present invention.

The stack 118 shown in FIG. 12 includes two units 118a, a unit 118b, and a belt-like separator 108b. The unit 118a is formed of a stack including a positive electrode 111a, the negative electrode 115, a positive electrode 111b, and a separator 108a. The unit 118b is formed of a stack including the positive electrode 111a, the negative electrode 115, and the separator 108a. The positive electrode 111a includes the positive electrode active material layer 102 in contact with one side of the positive electrode current collector 101, and the positive electrode friction layer 103 in contact with the other side of the positive electrode current collector 101. The positive electrode 111b includes the positive electrode active material layer 102 on each side of the positive electrode current collector 101. The stack 118 has a structure in which the unit 118b around which the separator 108b is wound is sandwiched between the two units 118a, and then the separator 108b is wound around the whole stack.

With the positive electrode friction layer 103, friction between the positive electrode 111a and the separator 108b can be reduced. Thus, the positive electrode current collector 101 in the positive electrode 111a can be prevented from being damaged by friction with the separator 108b when the stack 118 is curved.

Furthermore, in the stack 118, the positive electrode 111b in the unit 118a and the negative electrode 115 in the unit 118b face each other with the separator 108b positioned therebetween. This structure enables battery reaction between the units. Furthermore, the belt-like separator 108b wound around the units 118a and 118b can prevent excessive displacement of the units 118a and the unit 118b. Accordingly, the battery reaction between the units can hardly be interfered with.

Note that in this embodiment, the positive electrode 111 and the negative electrode 115 may be interchanged with each other as appropriate.

Note that it is possible to combine a plurality of the above-described structural examples to be implemented, as appropriate.

This embodiment can be implemented in appropriate combination with any of the other embodiments.

Embodiment 4

In this embodiment, the structure of a power storage device of one embodiment of the present invention will be described with an example of a secondary battery having a stacked-layer structure, with reference to FIGS. 13A to 13D.

Figure 13A:
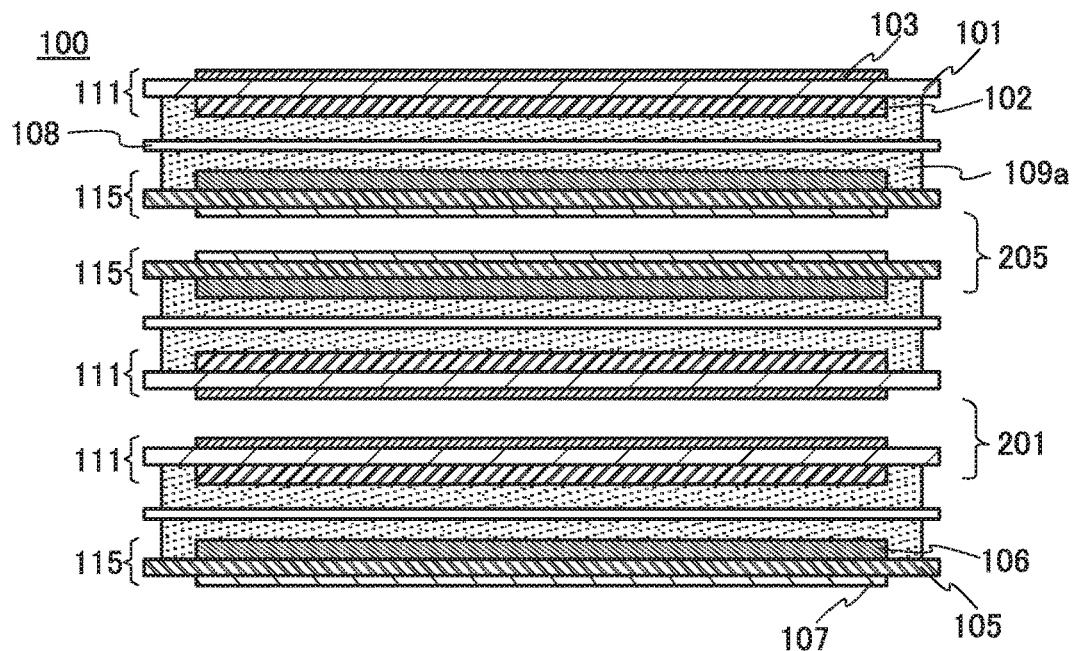
FIGS. 13A to 13D illustrate a secondary battery of one embodiment of the present invention.

A secondary battery 100 shown in FIG. 13A includes the positive electrodes 111, the negative electrodes 115, and the separators 108. The positive electrodes 111 and the negative electrodes 115 are the electrodes described in Embodiment 1. The positive electrode 111 includes the positive electrode current collector 101, the positive electrode active material layer 102, and the positive electrode friction layer 103. The negative electrode 115 includes the negative electrode current collector 105, the negative electrode active material layer 106, and the negative electrode friction layer 107. Furthermore, a gel electrolytic solution 109a is provided between one side of the positive electrode current collector 101 and one side of the negative electrode current collector 105.

The gel electrolytic solution 109a bonds the positive electrode current collector 101 and the negative electrode current collector 105 together and makes it easier to keep the distance between the positive electrode current collector 101 and the negative electrode current collector 105 constant. Consequently, variation in battery reaction rate between surfaces of the current collectors can be prevented, whereby reduction in the capacity of the secondary battery 100 and degradation of the secondary battery 100 can be suppressed.

The positive electrode 111, the separator 108, the gel electrolytic solution 109a, and the negative electrode 115 constitute one unit, and the secondary battery 100 includes a plurality of units.

Figure 13B:
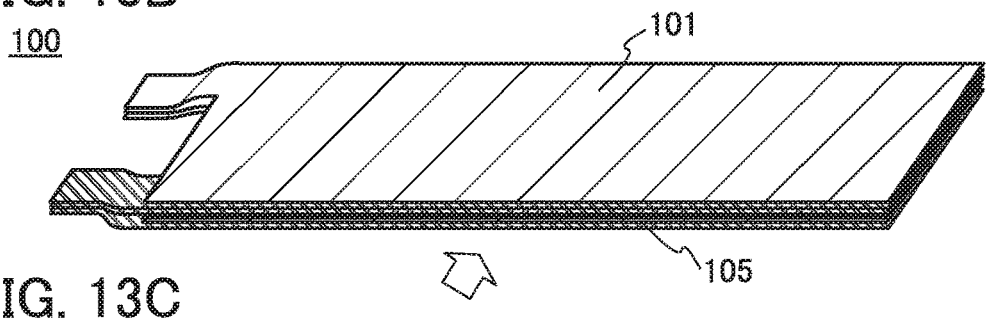
Figure 13C:
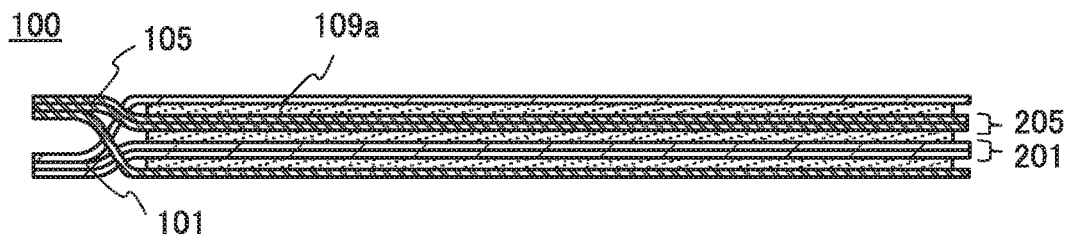

FIGS. 13B and 13C show an example of the secondary battery 100 in which three units are stacked. FIG. 13B is a perspective view of the secondary battery 100, and FIG. 13C is a side view of the secondary battery 100 seen from the direction denoted by the arrow in FIG. 13B. To clarify the explanation, the positive electrode current collector 101, the negative electrode current collector 105, and the gel electrolytic solution 109a are extracted and illustrated. The plurality of units are arranged such that two positive electrode friction layers 103 in two positive electrodes 111 face each other or two negative electrode friction layers 107 in two negative electrodes 115 face each other. With such arrangement, a contact surface 201 between the two positive electrode friction layers 103 and a contact surface 205 between the two negative electrode friction layers 107 can be formed.

At this time, it is preferable that the coefficient of static friction between the positive electrode friction layers 103 be smaller than the coefficient of static friction between the positive electrode current collectors 101.

Figure 13D:
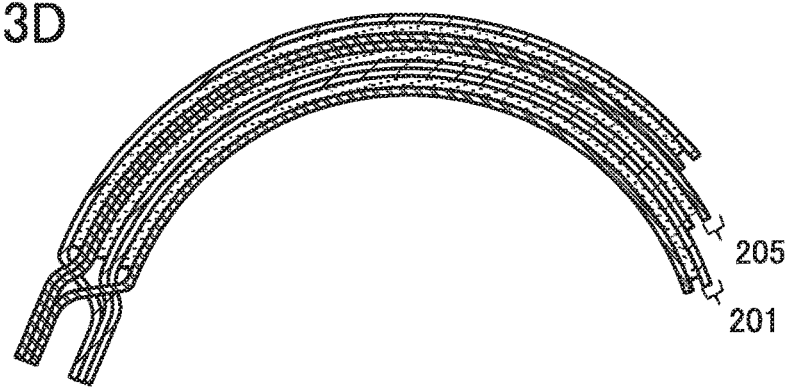

The contact surface 201 and the contact surface 205 can have lower friction than a contact surface between the positive electrode active material layer 102 and the separator 108, and a contact surface between the negative electrode active material layer 106 and the separator 108. The secondary battery 100 is formed by stacking units such that different sides of the two positive electrode current collectors 101 face each other, and different sides of the two negative electrode current collectors 105 face each other, whereby the contact surfaces having low friction slide as illustrated in FIG. 13D when the secondary battery 100 is curved. Thus, stress caused by the difference between the inner diameter and outer diameter of the curve can be easily relieved. Such a structure can prevent a portion with a locally steep curve and a portion without a locally steep curve from being formed in the current collectors, whereby variations in the distance between the positive electrode 111 and the negative electrode 115 can be suppressed.

This embodiment can be implemented in appropriate combination with any of the other embodiments.

Embodiment 5

In this embodiment, a method for manufacturing a power storage device of one embodiment of the present invention will be described with an example of a manufacturing method of the secondary battery 100, with reference to FIGS. 14A to 14D, FIGS. 15A to 15C, FIGS. 16A and 16B, FIGS. 17A and 17B, FIGS. 18A to 18C, and FIGS. 19A and 19B.

1. Covering Positive Electrode with Separator

Figure 14A:
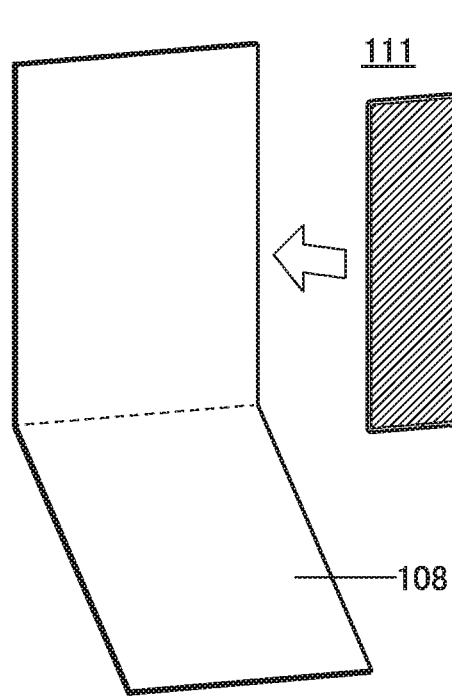
FIGS. 14A to 14D illustrate a method for manufacturing a secondary battery of one embodiment of the present invention.
Figure 14B:
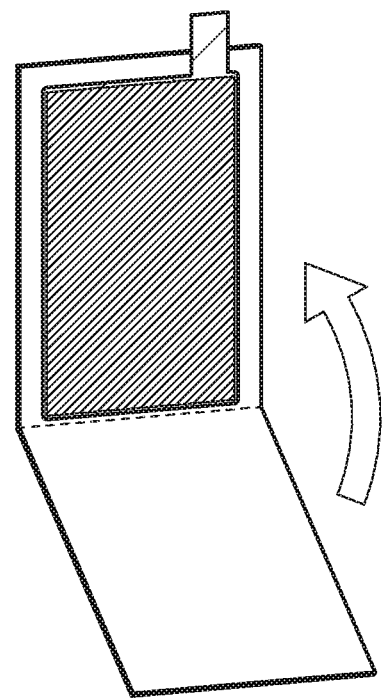
Figure 14C:
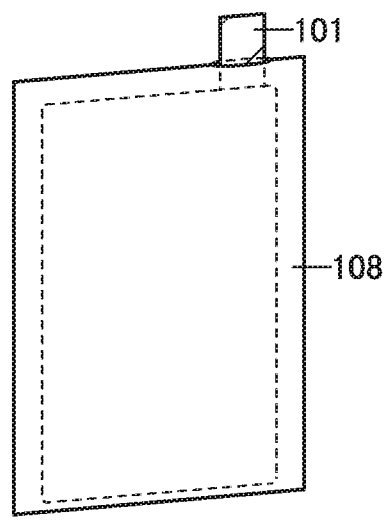

First, the positive electrode 111 is placed on the separator 108 (see FIG. 14A). The positive electrode 111 corresponds to the electrode described in Embodiment 1, which has the positive electrode active material layer 102 on one side of the positive electrode current collector 101 and the positive electrode friction layer 103 on the other side of the positive electrode current collector 101. Therefore, the positive electrode 111 does not have the positive electrode active material layer 102 on the side shown in FIG. 14A, and has the positive electrode active material layer 102 on the other side. Next, the separator 108 is folded along the dotted line in FIG. 14A (see FIG. 14B) so that the positive electrode 111 is interposed between the surfaces of the separator 108 (see FIG. 14C).

Figure 14D:
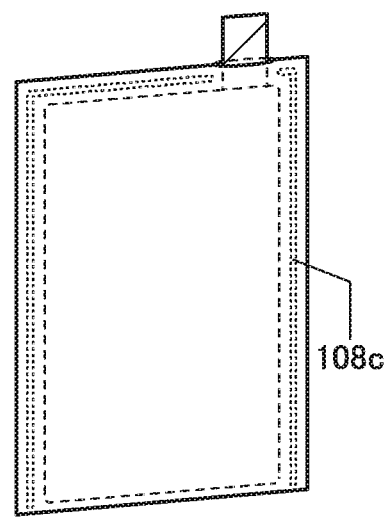

Then, the outer portions of the separator 108 are bonded to surround the positive electrode 111 inside (see FIG. 14D). The bonding of the outer portions of the separator 108 can be performed with the use of an adhesive or the like, by ultrasonic welding, or by thermal fusion bonding.

In this embodiment, polypropylene is used as the separator 108 and the outer portions of the separator 108 are bonded by heating. A bonding portion 108c is shown in FIG. 14D. In this manner, the positive electrode 111 can be covered with the separator 108. The separator 108 is formed so as to cover the positive electrode active material layer 102 and need not necessarily cover the whole positive electrode 111.

Note that although an example of folding the separator 108 is illustrated in FIGS. 14A to 14D, one embodiment of the present invention is not limited thereto. For example, the positive electrode 111 may be interposed between two separators. In that case, the bonding portion 108c may be formed to surround almost all of the four sides of the positive electrode 111.

The outer portions of the separator 108 may be bonded at a continuous bonding portion, discontinuous bonding portions, or dot-like bonding portions provided at regular intervals.

Alternatively, bonding may be performed on only one side of the outer portions. Alternatively, bonding may be performed on only two sides of the outer portions. Alternatively, bonding may be performed on four sides of the outer portions, in which case states of the four sides can be made uniform.

Note that although an example in which the positive electrode 111 is covered with the separator 108 has been described with reference to FIGS. 14A to 14D, one embodiment of the present invention is not limited thereto. The positive electrode 111 need not necessarily be covered with the separator 108, for example. The negative electrode 115, instead of the positive electrode 111, may be covered with the separator 108, for example.

2. Bonding at Side of Exterior Body

Next, a film used as an exterior body is folded along the dotted line (see FIG. 15A), and thermocompression bonding is performed at one side of the folded exterior body. The one side of the exterior body 110 that is subjected to the thermocompression bonding is shown as a bonding portion 110a in FIG. 15B.

3. Forming Unit by Placing Positive Electrode on Negative Electrode

Then, the positive electrode 111 is placed on the negative electrode 115 to form one unit, and the overlapping positive electrode 111 and negative electrode 115 are covered by the exterior body 110 (see FIG. 15C). Here, the positive electrode active material layer 102 and the negative electrode active material layer 106 are arranged to face each other with the separator 108 provided therebetween in one unit. Furthermore, the positive electrode friction layer 103 in the positive electrode 111 or the negative electrode friction layer 107 in the negative electrode 115 is on the outermost side of the unit. In this embodiment, an example in which one unit includes one positive electrode 111, one separator 108, and one negative electrode 115 is described.

Next, one side of the exterior body 110 is bonded by thermocompression bonding. The one side of the exterior body 110 that is subjected to the thermocompression bonding is shown as a bonding portion 110a in FIG. 16A.

Figure 16A:
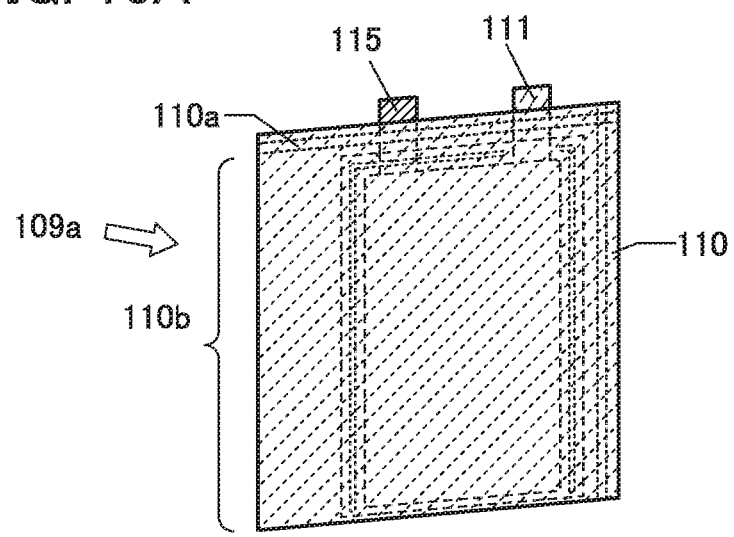
FIGS. 16A and 16B illustrate a method for manufacturing a secondary battery of one embodiment of the present invention.

Then, an electrolytic solution which is a material of the gel electrolytic solution 109a is injected from an unsealed side 110b of the exterior body 110 shown in FIG. 16A into a region covered with the exterior body 110. Then, the remaining open side of the exterior body 110 is sealed under vacuum, heat, and pressure. This process is performed in an environment from which oxygen is eliminated, for example, in a glove box. The evacuation to a vacuum may be performed with a vacuum sealer, a liquid pouring sealer, or the like. Heating and pressing can be performed by setting the exterior body 110 between two heatable bars provided in the sealer. An example of the conditions is as follows: the degree of vacuum is 60 kPa, the heating temperature is 190° C., the pressure is 0.1 MPa, and the time is three seconds.

Then, the electrolytic solution is sufficiently cured to be the gel electrolytic solution 109a. At this time, pressure may be applied to the unit via the exterior body 110. The application of pressure enables removal of bubbles which enter between the positive electrode and the negative electrode when the electrolytic solution is injected.

4. Taking Unit Out and Removing Unnecessary Gel Electrolytic Solution

Figure 16B:
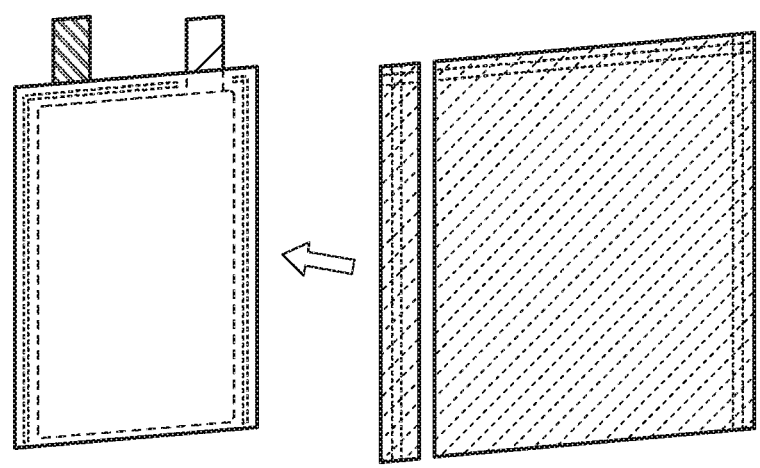

Next, the exterior body 110 is cut and unsealed, and the unit is taken out (see FIG. 16B). The positive electrode current collector 101 and the negative electrode current collector 105 are bonded to each other with the gel electrolytic solution 109a in a region where the positive electrode active material layer 102 and the negative electrode active material layer 106 face each other in the unit. Thus, the gel electrolytic solution 109a which is attached to the outer surfaces of the unit is removed while the gel electrolytic solution 109a which bonds the positive electrode current collector 101 to the negative electrode current collector 105 is retained. The removal of the gel electrolytic solution 109a attached to the outer surfaces of the unit can reduce the friction between the surfaces of the positive electrode friction layers 103 of two positive electrodes 111, or the friction between the surfaces of the negative electrode friction layers 107 of two negative electrodes 115.

There is no particular limitation on a method for removing unnecessary portions of the gel electrolytic solution 109a. For example, a sheet is attached in advance to the surface of the positive electrode current collector 101 on which a positive electrode active material is not provided or the surface of the negative electrode current collector 105 on which a negative electrode active material is not provided, and the sheet is removed together with the gel electrolytic solution 109a. Alternatively, the gel electrolytic solution 109a may be wiped off with a cloth or a waste cloth.

5. Stacking Units and Connecting Units to Lead

Next, a plurality of units fabricated as described above are stacked (see FIG. 17A). In this embodiment, an example in which three units are used is described. Here, it is preferable that the units be arranged so that the other surfaces of the negative electrode current collectors 105 face each other. Furthermore, it is preferable that the units be arranged so that the surfaces of the separators covering the positive electrode current collectors face each other.

Next, a positive electrode lead 141 including a sealing layer 140 is electrically connected to positive electrode tabs of the plurality of positive electrode current collectors 101 by ultrasonic wave irradiation while pressure is applied (ultrasonic welding).

The lead electrode is likely to be cracked or cut by stress due to external force applied after manufacture of the power storage unit.

Figure 17A:
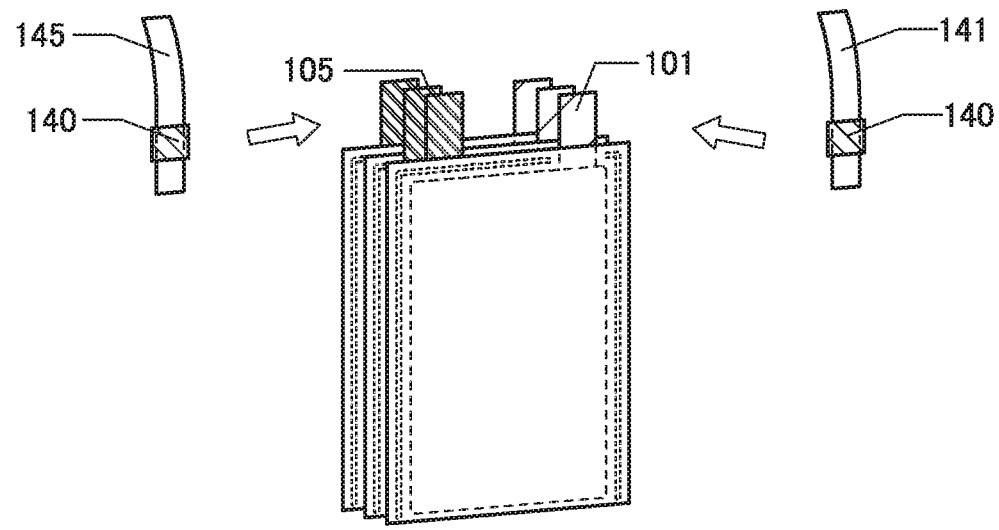
FIGS. 17A and 17B illustrate a method for manufacturing a secondary battery of one embodiment of the present invention.
Figure 17B:
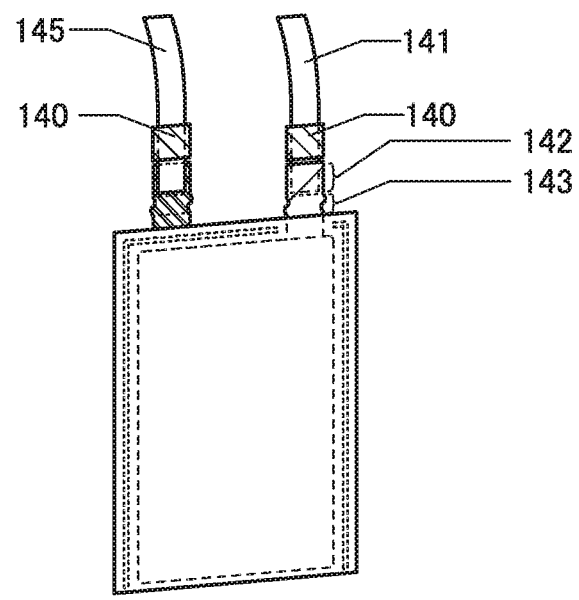

Here, when subjected to ultrasonic welding, the positive electrode lead 141 is placed between bonding dies provided with projections, whereby a connection region 142 and a curved portion 143 can be formed in the positive electrode tab (see FIG. 17B).

This curved portion 143 can relieve the stress caused by external force applied after fabrication of the secondary battery 100, whereby the reliability of the secondary battery 100 can be improved.

A method for easily relieving the stress caused by external force applied after fabrication of the secondary battery is not limited to the formation of the curved portion 143 in the positive electrode tab, but may be forming the positive electrode current collector using a high-strength material such as stainless steel to a thickness of 10 μm or less.

It is needless to say that the above methods may be combined to relieve concentration of stress in the positive electrode tab.

Then, in a manner similar to that of the positive electrode current collector 101, a negative electrode lead 145 including a sealing layer 140 is electrically connected to negative electrode tabs of the negative electrode current collectors 105 by ultrasonic welding.

6. Resealing

Next, the plurality of units electrically connected to each other are covered with a newly prepared exterior body 110

Figure 18A:
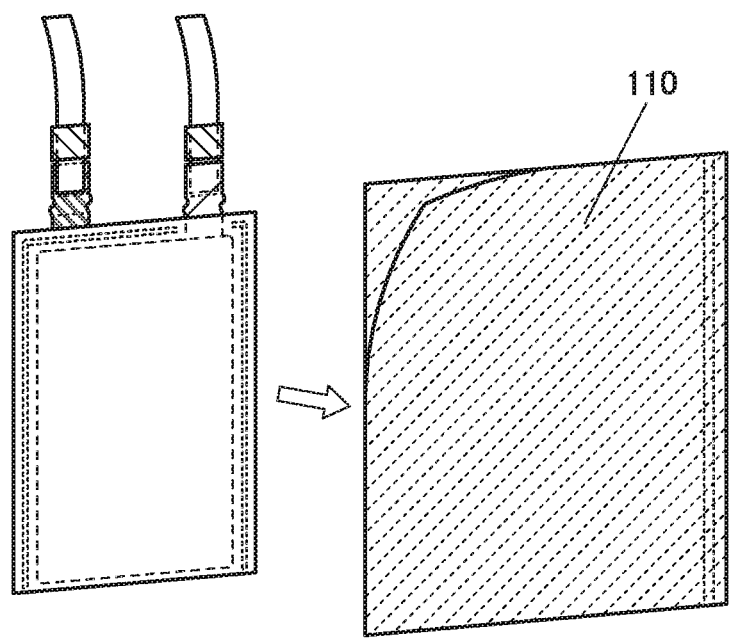
FIGS. 18A to 18C illustrate a method for manufacturing a secondary battery of one embodiment of the present invention.

(see FIG. 18A). Then, one side of the exterior body 110 which overlaps with the sealing layer 140 of the positive electrode lead 141 and the sealing layer 140 of the negative electrode lead 145 is subjected to thermocompression bonding in a manner similar to that of the first sealing (see FIG. 18B). After that, a solvent or an electrolyte may be additionally injected as needed. Then, the exterior body 110 is sealed under vacuum, heat, and pressure in a manner similar to that of the first sealing, whereby the secondary battery 100 is obtained (see FIG. 18C).

7. Modification Example

Figure 18B:
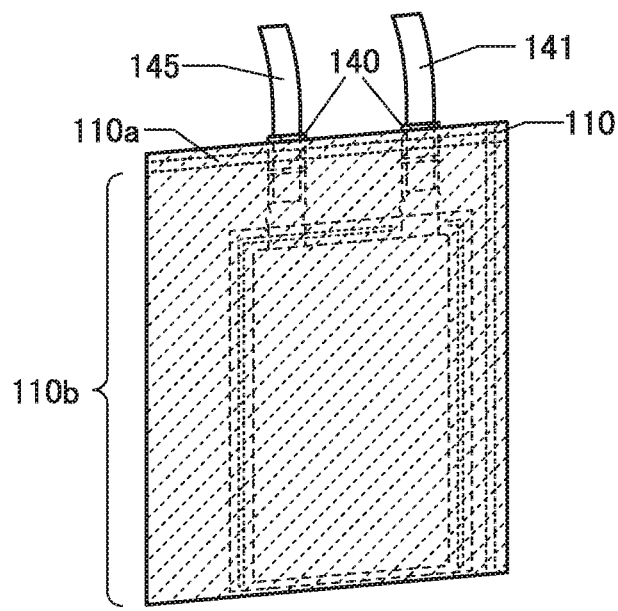
Figure 18C:
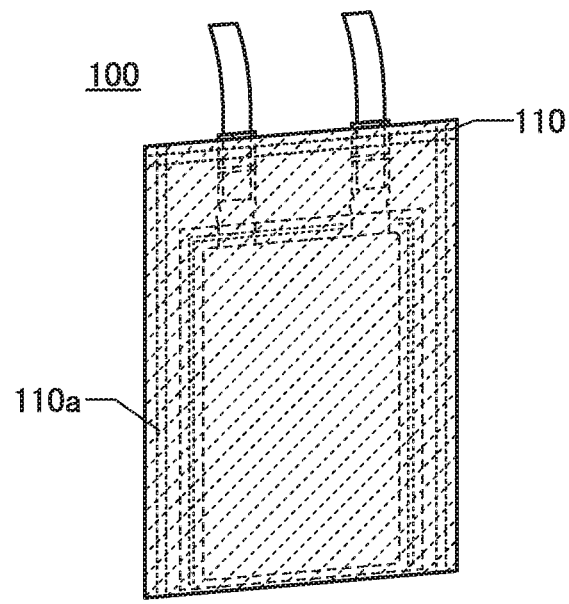

FIG. 19A shows a modification example of the secondary battery 100. The secondary battery 100 shown in FIG. 19A is different from the secondary battery 100 shown in FIGS. 18A to 18C in the arrangement of the positive electrode lead 141 and the negative electrode lead 145. Specifically, the positive electrode lead 141 and the negative electrode lead 145 in the secondary battery 100 in FIGS. 18A to 18C are provided on the same side of the exterior body 110, whereas the positive electrode lead 141 and the negative electrode lead 145 in the secondary battery 100 in FIGS. 19A and 19B are provided on different sides of the exterior body 110. The lead electrodes of the secondary battery of one embodiment of the present invention can be freely positioned as described above; therefore, the degree of freedom in design is high. Accordingly, a product including the secondary battery of one embodiment of the present invention can have a high degree of freedom in design. Furthermore, the yield of products each including the secondary battery of one embodiment of the present invention can be increased.

FIG. 19B illustrates a manufacturing process of the secondary battery 100 in FIG. 19A. The manufacturing method of the secondary battery 100 in FIGS. 18A to 18C can be referred to for the details. Note that in FIG. 19B, the gel electrolytic solution 109a is not shown.

Pressing (e.g., embossing) may be performed to form unevenness in advance on a surface of a film used as the exterior body 110. The unevenness on the surface of the film increases flexibility of a secondary battery and the effect of relieving stress. The depressions and projections formed on the film surface by embossing create a closed space sealed by the film serving as part of the wall of the sealing structure and whose inner volume is variable. The depressions and projections of the film may form an accordion structure or bellows structure. Note that, without being limited to embossing which is a kind of pressing, any method that allows formation of a relief on part of the film can be employed.

This embodiment can be implemented in appropriate combination with any of the other embodiments.

Embodiment 6

In this embodiment, electronic devices in which the secondary battery 100 of one embodiment of the present invention can be incorporated will be described with reference to FIGS. 20A and 20B.

The secondary battery 100 of one embodiment of the present invention is suitable for a wearable device because the secondary battery 100 is flexible.

Figure 20A:
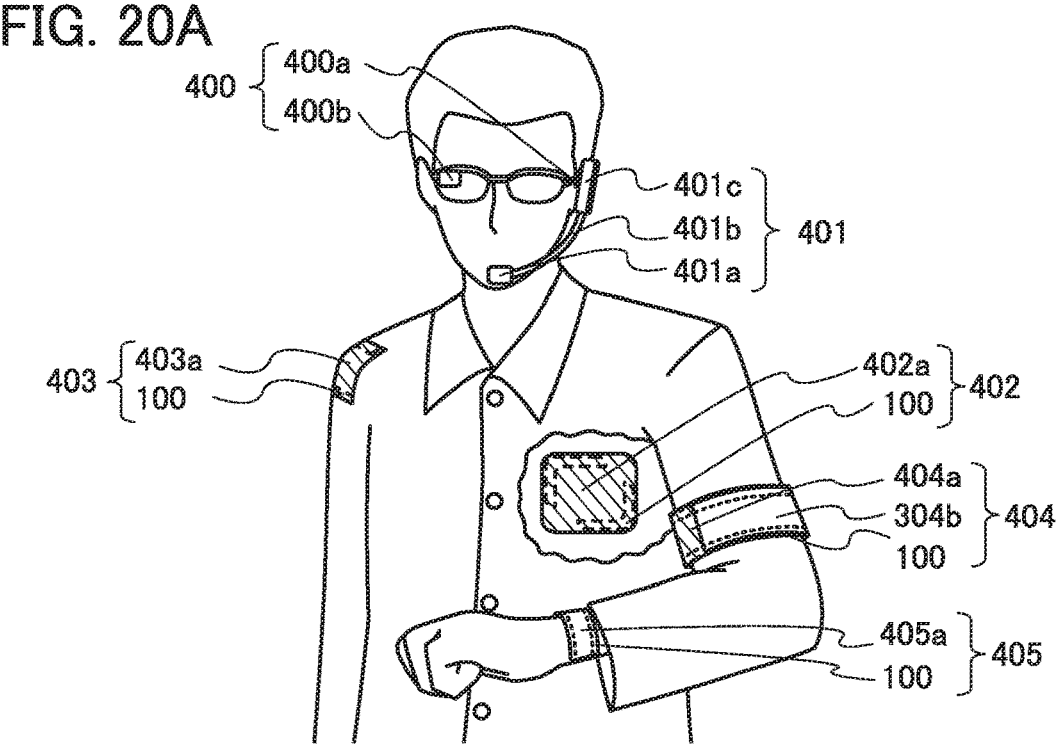
FIGS. 20A and 20B each illustrate electronic equipment of one embodiment of the present invention.
Figure 20B:
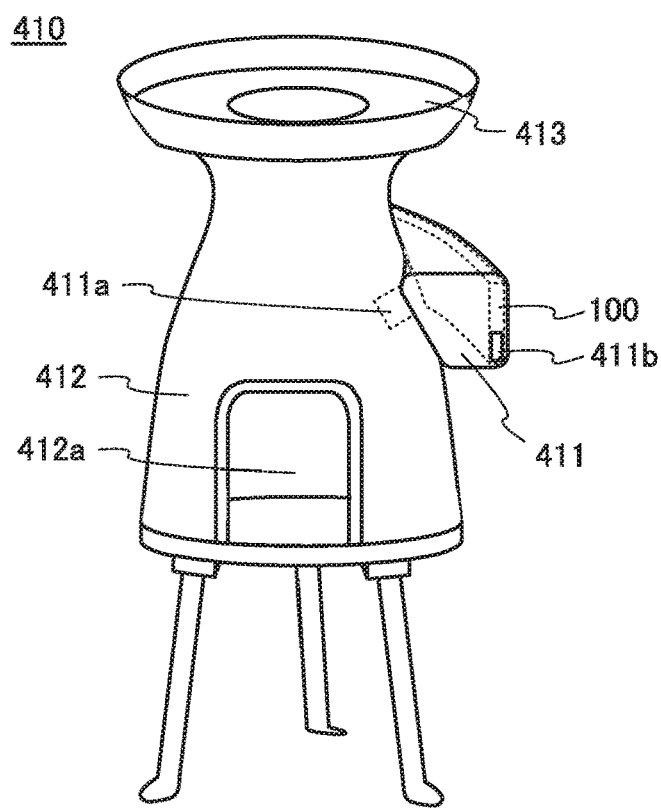

For example, the secondary battery 100 can be incorporated in a glasses-type device 400 illustrated in FIG. 20A. The glasses-type device 400 includes a frame 400a and a display part 400b. The secondary battery 100 is incorporated in a temple of the frame 400a having a curved shape, whereby the glasses-type device 400 can have a well-balanced weight and can be used continuously for a long time.

The secondary battery 100 can be incorporated in a headset-type device 401. The headset-type device 401 includes at least a microphone part 401a, a flexible pipe 401b, and an earphone part 401c. The plurality of secondary batteries 100 can be incorporated in the flexible pipe 401b and the earphone part 401c.

Furthermore, the secondary battery 100 can be incorporated in a device 402 that can be attached directly to a body. The plurality of secondary batteries 100 are provided in a thin housing 402a of the device 402.

Furthermore, the secondary battery 100 can be incorporated in a device 403 that can be attached to clothes. The plurality of the secondary batteries 100 can be provided in a thin housing 403a of the device 403.

Furthermore, the secondary battery 100 can be incorporated in an armband device 404. In the armband device 404, a display part 404b is provided over a main body 404a and the plurality of secondary batteries 100 can be provided in the main body 404a.

Furthermore, the secondary battery 100 can be incorporated in a watch-type device 405. The watch-type device 405 includes a display part 405a, and the plurality of secondary batteries 100 can be provided in the watch-type device 405.

Since the secondary battery 100 of one embodiment of the present invention can be curved, it can be incorporated with high space efficiency in any of a variety of electronic equipment. For example, in a stove 410 illustrated in FIG. 20B, a module 411 is attached to a main body 412. The module 411 includes the secondary battery 100, a motor, a fan, an air outlet 411a, and a thermoelectric generation device. In the stove 410, after a fuel is injected through an opening 412a and ignited, outside air can be sent through the air outlet 411a to the inside of the stove 410 by rotating the motor and the fan which are included in the module 411 using power of the secondary battery 100. In this manner, the stove 410 can have strong heating power because outside air can be taken into the inside of the stove 410 efficiently. In addition, cooking can be performed on an upper grill 413 with thermal energy generated by the combustion of fuel. The thermal energy is converted into power with the thermoelectric generation device of the module 411, and the secondary battery 100 can be charged with the power. The power charged into the secondary battery 100 can be output through an external terminal 411b.

This embodiment can be implemented in appropriate combination with any of the other embodiments.

Embodiment 7

An example of a moving object that is an example of the electrical equipment will be described with reference to FIGS. 21A and 21B.

The secondary battery described in the above embodiments can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 21A:
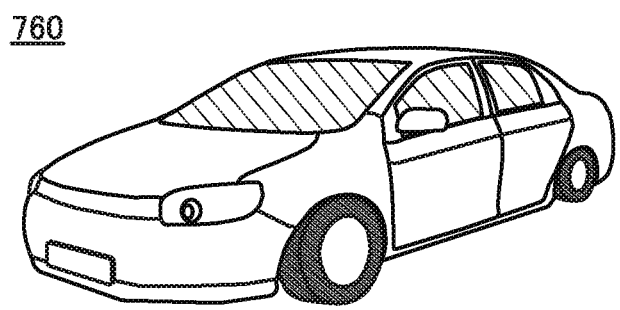
FIGS. 21A and 21B illustrate electronic equipment of one embodiment of the present invention.
Figure 21B:
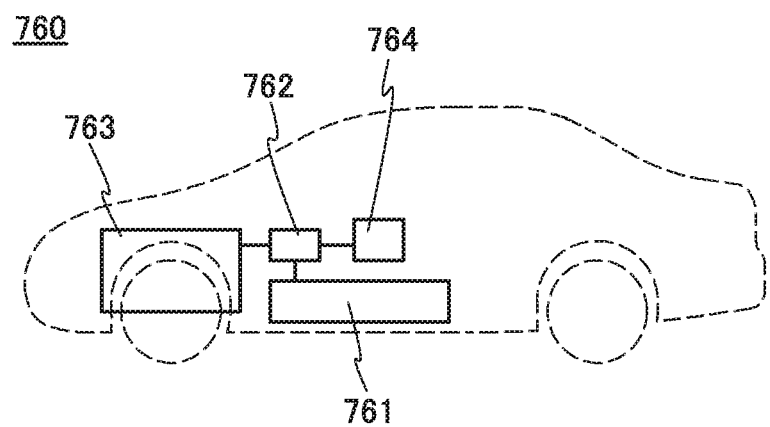

FIGS. 21A and 21B illustrate an example of an electric vehicle. An electric vehicle 760 is equipped with a battery 761. The output of the electric power of the battery 761 is adjusted by a control circuit 762 and the electric power is supplied to a driving device 763. The control circuit 762 is controlled by a processing unit 764 including a ROM, a RAM, a CPU, or the like which is not illustrated.

The driving device 763 includes a DC motor or an AC motor either alone or in combination with an internal-combustion engine. The processing unit 764 outputs a control signal to the control circuit 762 based on input data such as data of operation (e.g., acceleration, deceleration, or stop) by a driver or data during driving (e.g., data on an upgrade or a downgrade, or data on a load on a driving wheel) of the electric vehicle 760. The control circuit 762 adjusts the electric energy supplied from the battery 761 in accordance with the control signal of the processing unit 764 to control the output of the driving device 763. In the case where the AC motor is mounted, although not illustrated, an inverter that converts direct current into alternate current is also incorporated.

The battery 761 can be charged by electric power supply from the outside using a plug-in technique. For example, the battery 761 is charged by a commercial power source through a power plug. The battery 761 can be charged by converting the supplied power into DC constant voltage having a predetermined voltage level through a converter such as an AC-DC converter. The use of the secondary battery including the secondary battery electrode of one embodiment of the present invention as the battery 761 can contribute to an increase in battery capacity, leading to an improvement in convenience. When the battery 761 itself can be more compact and more lightweight as a result of improved characteristics of the battery 761, the vehicle can be lightweight, leading to an increase in fuel efficiency.

Note that it is needless to say that one embodiment of the present invention is not limited to the electronic equipment described above as long as the secondary battery of one embodiment of the present invention is included.

This embodiment can be implemented in appropriate combination with any of the other embodiments.

Embodiment 8

In this embodiment, wireless sensors in each of which the secondary battery 100 is incorporated will be described with reference to FIGS. 22A and 22B and FIG. 23.

Structural Example 1 of Wireless Sensor

Figure 22A:
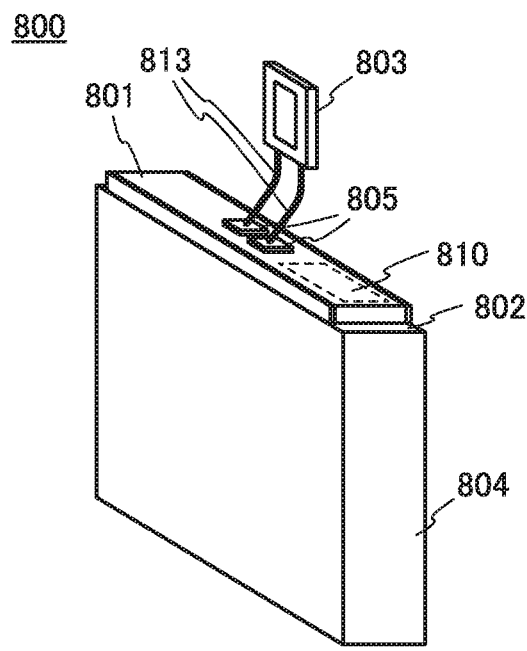
FIGS. 22A and 22B illustrate electronic equipment of one embodiment of the present invention.
Figure 22B:
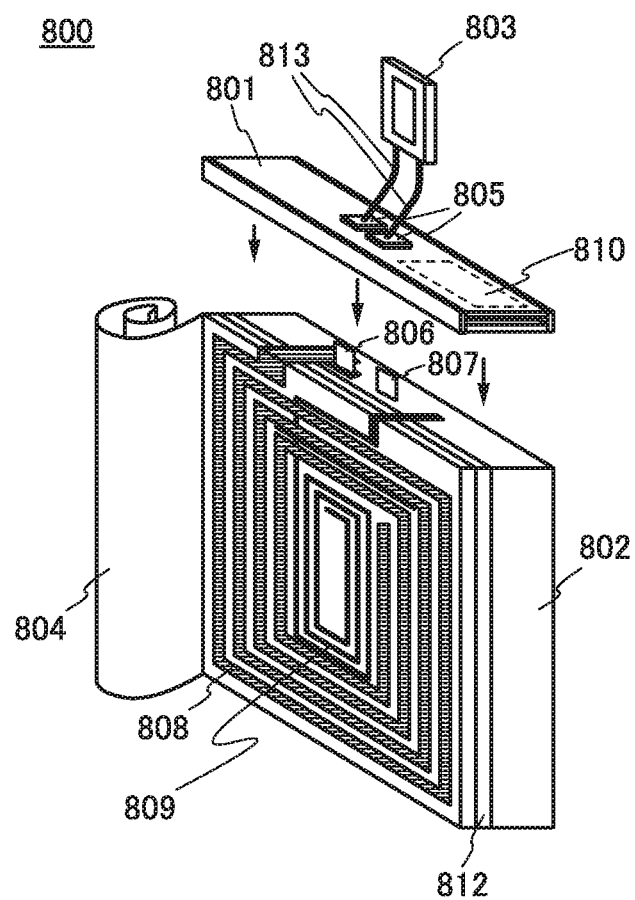

FIGS. 22A and 22B are external views illustrating a structural example of a wireless sensor 800. The wireless sensor 800 includes a circuit board 801, a battery 802, and a sensor 803. A label 804 is attached to the battery 802. Furthermore, as illustrated in FIG. 22B, the wireless sensor 800 includes a terminal 806, a terminal 807, an antenna 808, and an antenna 809. As the battery 802, the secondary battery 100 can be used.

The circuit board 801 is provided with terminals 805 and an integrated circuit 810. The terminals 805 are connected to the sensor 803 via wirings 813. Note that the number of the terminals 805 is not limited to two and determined in accordance with the need.

Furthermore, the circuit board 801 may be provided with a semiconductor element such as a transistor or a diode, a resistor, a wiring, or the like.

In the case where heat generated by the battery 802 or an electromagnetic field generated by the antennas 808 and 809 adversely affects the operation of the sensor 803, the length of each of the wirings 813 is extended so that the sensor 803 is apart from the battery 802 or the antennas 808 and 809.

The length of the wiring 813 is, for example, longer than or equal to 1 cm and shorter than or equal to 1 m, preferably longer than or equal to 1 cm and shorter than or equal to 50 cm, more preferably longer than or equal to 1 cm and shorter than or equal to 30 cm.

The sensor 803 may be placed over the circuit board 801.

The integrated circuit 810 may be provided on the surface of the circuit board 801 which faces the battery 802.

The shape of each of the antennas 808 and 809 is not limited to a coil shape and may be a linear shape or a plate shape. Furthermore, a planar antenna, an aperture antenna, a traveling-wave antenna, an EH antenna, a magnetic-field antenna, or a dielectric antenna may be used. Alternatively, the antenna 808 or 809 may be a flat-plate conductor. The flat-plate conductor can serve as one of conductors for electric field coupling. That is, the antenna 808 or 809 can serve as one of two conductors of a capacitor. Thus, power can be transmitted and received not only by an electromagnetic field or a magnetic field but also by an electric field.

The integrated circuit 810 includes a circuit formed using a Si transistor or an oxide semiconductor transistor (OS transistor).

The line width of the antenna 808 is preferably larger than that of the antenna 809. This makes it possible to increase the amount of power that is received by the antenna 808.

The sensor 803 is a circuit having a function of outputting various kinds of data such as thermal data, mechanical data, and electromagnetic data, as analog data.

The wireless sensor 800 includes a layer 812 between the battery 802 and the antennas 808 and 809. The layer 812 has, for example, a function of blocking an electromagnetic field that is generated by the battery 802. A magnetic body can be used as the layer 812, for example.

Structural Example 2 of Wireless Sensor

Figure 23:
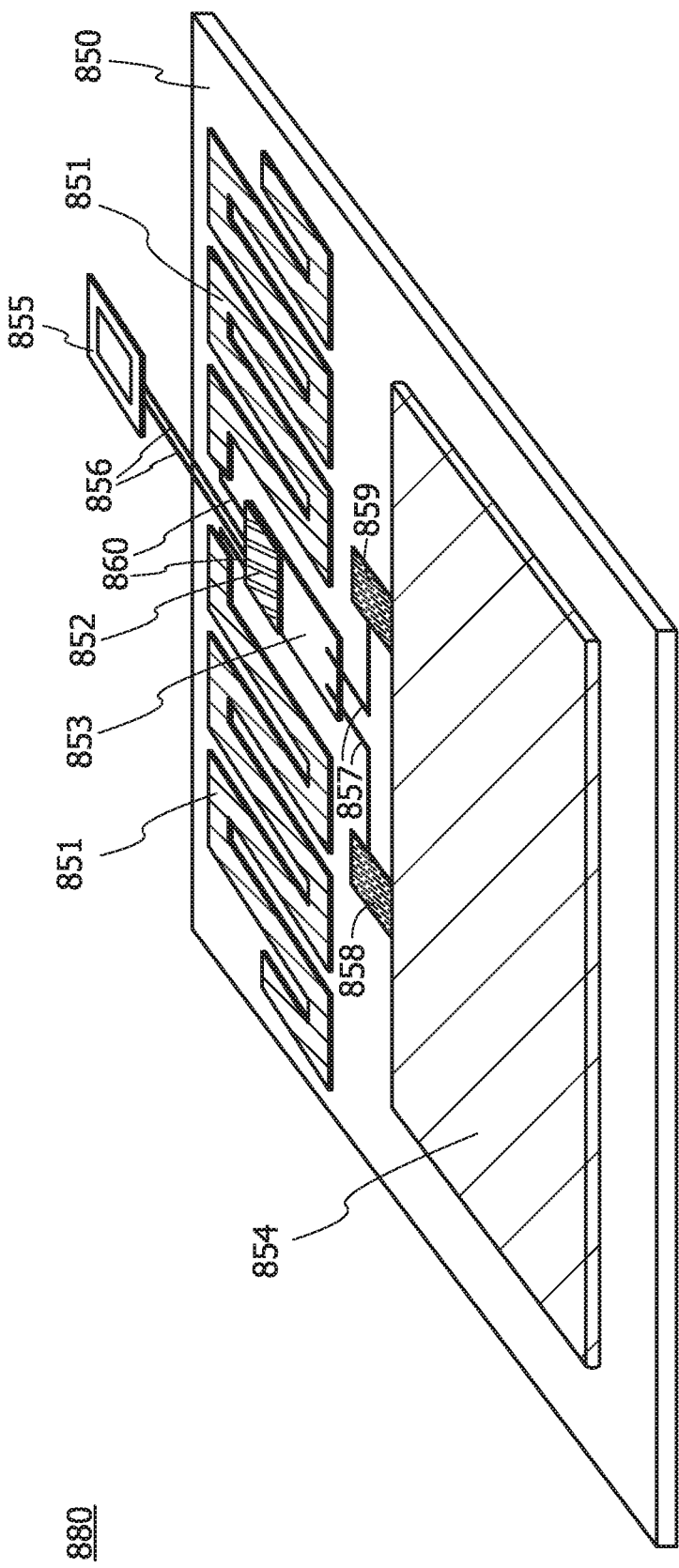
FIG. 23 illustrates electronic equipment of one embodiment of the present invention.
Figure 24:
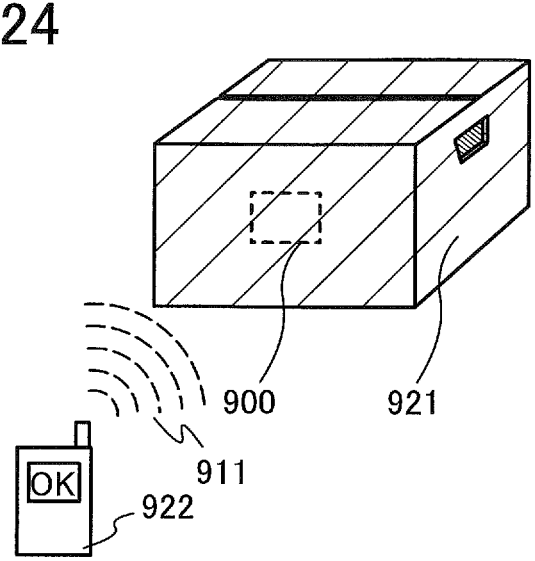
FIG. 24 illustrates electronic equipment of one embodiment of the present invention.

FIG. 23 is an external view illustrating a structural example of a wireless sensor 880. The wireless sensor 880 includes a support 850, an antenna 851, an integrated circuit 852, a circuit board 853, a sensor 855, and a battery 854. As the battery 854, the secondary battery 100 can be used.

The circuit board 853 is provided with the integrated circuit 852. Furthermore, the circuit board 853 may also be provided with a semiconductor element such as a transistor or a diode, a resistor, a wiring, or the like.

The integrated circuit 852 includes a circuit formed using a Si transistor or an OS transistor.

The antenna 851 is connected to the integrated circuit 852 via a wiring 860. For the details of the antenna 851, the description of the antenna 808 or 809 of the wireless sensor 800 can be referred to.

The sensor 855 is connected to the integrated circuit 852 via a wiring 856. The sensor 855 is formed either outside the support 850 or over the support 850.

The sensor 855 is a circuit having a function of outputting various kinds of data such as thermal data, mechanical data, and electromagnetic data, as analog data.

The battery 854 includes a terminal 858 having a function of one of a positive electrode and a negative electrode and a terminal 859 having a function of the other of the positive electrode and the negative electrode. Each of the terminals is connected to the integrated circuit 852 via a wiring 857 and the circuit board 853.

The support 850 can be formed using glass, quartz, plastic, metal, stainless steel foil, tungsten foil, a flexible substrate, a laminate film, a substrate film, paper including a fibrous material, or wood, for example. Examples of a flexible substrate include a flexible synthetic resin such as plastics typified by polyethylene terephthalate (PET), polyethylene naphthalate (PEN), and polyether sulfone (PES), and acrylic. Examples of the material of a laminate film include polypropylene, polyester, polyvinyl fluoride, and polyvinyl chloride. Examples of the material of a substrate film include polyester, polyamide, polyimide, aramid, epoxy, an inorganic vapor deposition film, and paper.

The wireless sensor 880 is preferably thin. In particular, the thickness of the wireless sensor 880 including the thicknesses of the battery 854 and the support 850 is preferably larger than or equal to 0.1 mm and smaller than or equal to 5 mm, more preferably larger than or equal to 0.1 mm and smaller than or equal to 3 mm, still more preferably larger than or equal to 0.1 mm and smaller than or equal to 1 mm. The wireless sensor 880 having the above thickness can be embedded in paper such as a poster or corrugated cardboard.

Furthermore, the wireless sensor 880 is preferably flexible. In particular, it is preferable that the support 850 and the battery 854 can be changed in their forms with a curvature radius of 30 mm or less, preferably 10 mm or less. The wireless sensor 880 having the above structure can, when attached to clothes or a human body, follow movements of the clothes or the human body.

In order to obtain the above structure, the battery 854 is preferably thin and flexible. As an exterior body of the battery 854, for example, a film having a three-layer structure including a first thin film, a second thin film, and a third thin film formed in this order may be used. Note that the third thin film has a function of the outer surface of the exterior body. Examples of the material for the first thin film include polyethylene, polypropylene, polycarbonate, ionomer, and polyamide. Examples of the material for the second thin film include a highly flexible thin metal film of aluminum, stainless steel, copper, nickel, or the like. Examples of the material for the third thin film include an insulating synthetic resin film of a polyamide-based resin, a polyester-based resin, or the like.

This embodiment can be implemented in appropriate combination with any of the other embodiments.

Embodiment 9

In this embodiment, application examples of the wireless sensor described in Embodiment 8 will be described with reference to FIG. 24, FIGS. 25A and 25B, and FIG. 26. As a wireless sensor 900 shown in FIG. 24, FIGS. 25A and 25B, and FIG. 26, the wireless sensor 800 or the wireless sensor 880 described in Embodiment 8 can be used.

The wireless sensor 900 is attached to or incorporated in an article 921, and a radio signal 911 is sent from an external reader 922, for example. The wireless sensor 900 having received the radio signal 911 can obtain data of a temperature or the like without touching the article 921, owing to the sensor, and send the data to the reader 922.

Figure 25A:
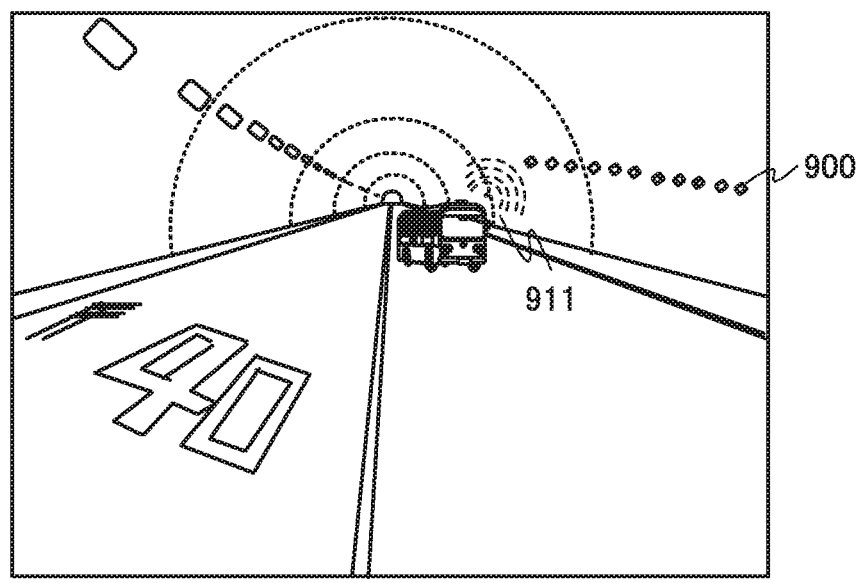
FIGS. 25A and 25B each illustrate electronic equipment of one embodiment of the present invention.

Another application form of the wireless sensor can be described with reference to the schematic diagram in FIG. 25A. For example, the wireless sensor 900 is embedded in a tunnel wall surface, and a radio signal 911 is sent externally. The wireless sensor 900 having received the radio signal 911 can obtain data on the tunnel wall surface by the sensor and send the data.

Figure 25B:
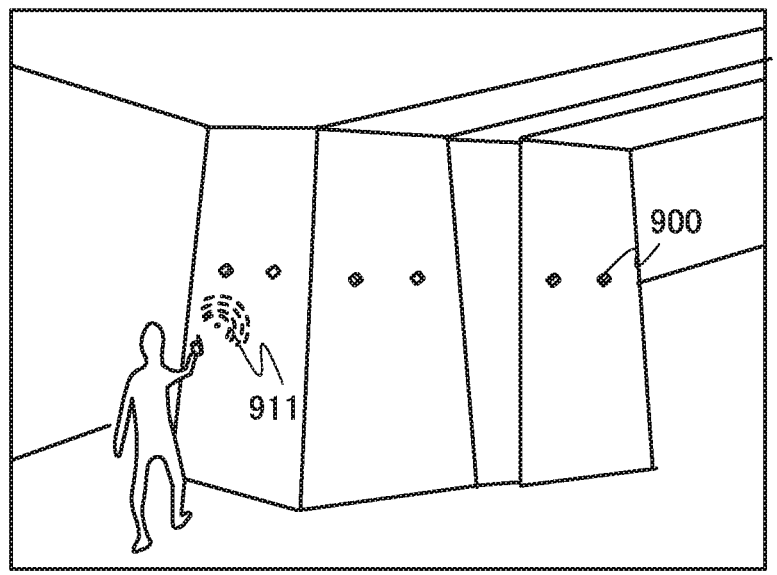

Another application form of the wireless sensor can be described with reference to the schematic diagram in FIG. 25B. For example, the wireless sensor 900 is embedded in a wall surface of a pillar of a bridge, and a radio signal 911 is sent externally. The wireless sensor 900 having received the radio signal 911 can obtain data in the pillar of the bridge by the sensor and send the data.

Figure 26:
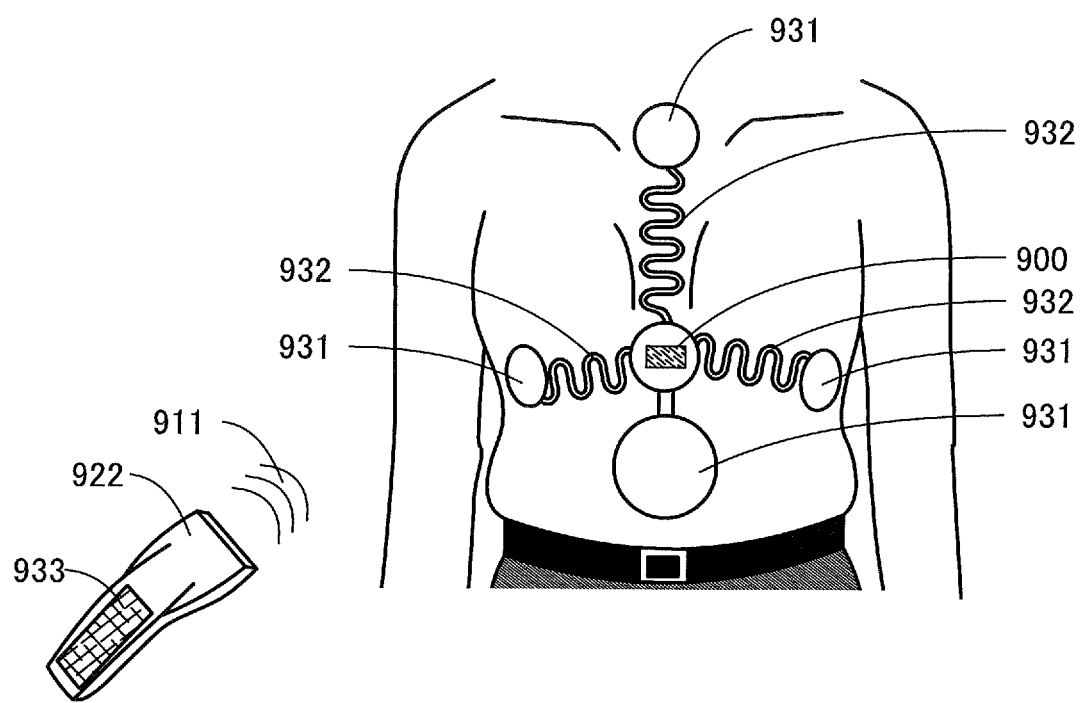
FIG. 26 illustrates electronic equipment of one embodiment of the present invention.

Another application form of the wireless sensor can be described with reference to the schematic diagram in FIG. 26. For example, the wireless sensor 900 is attached to a human body with the use of a bond pad or the like, and a radio signal 911 is sent from a reader 922. The wireless sensor 900 having received the radio signal 911 can obtain data such as biological data by supplying a signal to an electrode 931 or the like attached to the human body through a wiring 932, and send the data. The obtained data can be checked on a display part 933 of the reader 922.

This embodiment can be implemented in appropriate combination with any of the other embodiments.

This application is based on Japanese Patent Application serial no. 2015-003149 filed with Japan Patent Office on Jan. 9, 2015, the entire contents of which are hereby incorporated by reference.

What is claimed is:

1. An electrode comprising:
a stack comprising a current collector, an active material layer, and a friction layer,
wherein the stack includes a first portion, a second portion, and a third portion connected to the first portion and the second portion,
wherein the stack is curved in the third portion so that the first portion faces the second portion,
wherein the active material layer is in contact with a first surface of the current collector, and a second surface of the current collector is in contact with a first surface of the friction layer,
wherein the friction layer is curved in the third portion so that a second surface of the friction layer included in the first portion is in contact with the second surface of the friction layer included in the second portion, and
wherein a coefficient of static friction between the second surface of the friction layer included in the first portion and the second surface of the friction layer included in the second portion is smaller than a coefficient of static friction between the second surface of the current collector included in the first portion and the second surface of the current collector included in the second portion, wherein the coefficient of static friction between the friction layer included in the first portion and the friction layer included in the second portion is less than or equal to 0.05.

2. The electrode according to claim 1, wherein the friction layer in the stack comprises an organic film.

3. The electrode according to claim 2, wherein the organic film comprises fluororesin.

4. The electrode according to claim 1, wherein the friction layer in the stack comprises an inorganic film.

5. A power storage device comprising:
a first electrode;
a second electrode;
an electrolytic solution; and
a separator between the first electrode and the second electrode,
wherein the first electrode comprises a stack comprising a current collector, an active material layer, and a friction layer which is not the separator,
wherein the stack includes a first portion, a second portion, and a third portion connected to the first portion and the second portion,
wherein the stack is curved in the third portion so that the first portion faces the second portion, wherein the active material layer is in contact with a first surface of the current collector, and a second surface of the current collector is in contact with a first surface of the friction layer, wherein the friction layer is curved in the third portion so that a second surface of the friction layer included in the first portion is in contact with the second surface of the friction layer included in the second portion, wherein a coefficient of static friction between the second surface of the friction layer included in the first portion and the second surface of the friction layer included in the second portion is smaller than a coefficient of static friction between the second surface of the current collector included in the first portion and the second surface of the current collector included in the second portion, wherein the first electrode is configured to operate as one of a positive electrode and a negative electrode, and wherein the second electrode is configured to operate as the other of the positive electrode and the negative electrode, wherein the coefficient of static friction between the friction layer included in the first portion and the friction layer included in the second portion is less than or equal to 0.05.

6. The power storage device according to claim 5,
wherein the second electrode comprises a second current collector, a second active material layer, and a second friction layer, and wherein the second active material layer is on a first side of the second current collector, and a second side of the second current collector is on a first side of the second friction layer.

7. The power storage device according to claim 6,
wherein the second electrode includes a fourth portion and a fifth portion, wherein each of the fourth portion and the fifth portion includes the second current collector, the second active material layer, and the second friction layer, wherein the fourth portion and the fifth portion overlap with each other, and wherein a surface on a second side of the second friction layer included in the fourth portion and the surface on the second side of the second friction layer included in the fifth portion are in contact with each other.

8. The power storage device according to claim 7, wherein a coefficient of static friction between the surface on the second side of the second friction layer included in the fourth portion and the surface on the second side of the second friction layer included in the fifth portion is smaller than a coefficient of static friction between the second current collector included in the fourth portion and the second current collector included in the fifth portion.

9. The power storage device according to claim 6,
wherein the second electrode includes a fourth portion and a fifth portion, wherein the fourth portion includes the second current collector and the second active material layer, wherein the fifth portion includes the second current collector, the second active material layer, and the second friction layer, wherein the fourth portion and the fifth portion overlap with each other, and wherein the second current collector in the fourth portion and the second friction layer in the fifth portion are in contact with each other.

10. The power storage device according to claim 9, wherein a coefficient of static friction between the second current collector included in the fourth portion and the second friction layer included in the fifth portion is smaller than a coefficient of static friction between the second current collector included in the fourth portion and the second current collector included in the fifth portion.

11. The power storage device according to claim 5,
wherein the friction layer and the separator are in contact with each other, and wherein a coefficient of static friction between the friction layer and the separator is smaller than a coefficient of static friction between the current collector and the separator.

12. The power storage device according to claim 5, wherein the power storage device has an accordion fold structure.

13. The power storage device according to claim 5, wherein the power storage device has a wound structure.

14. The power storage device according to claim 5, further comprising a flexible exterior body,
wherein the flexible exterior body encloses the first electrode, the second electrode, and the electrolytic solution.

15. The power storage device according to claim 14, wherein the flexible exterior body comprises a film.

16. The power storage device according to claim 5, wherein the power storage device has flexibility.

17. Electronic equipment comprising:
the power storage device according to claim 5; and
a housing having a curved portion.

18. Electronic equipment comprising:
the power storage device according to claim 5; and
a flexible housing.

* * * * *